United States Patent
Lee et al.

(10) Patent No.: US 9,575,372 B2
(45) Date of Patent: Feb. 21, 2017

(54) DISPLAY DEVICE HAVING ROOF LAYERS AND MANUFACTURING METHOD OF THE DISPLAY DEVICE

(71) Applicant: Samsung Display Co., Ltd., Yongin, Gyeonggi-Do (KR)

(72) Inventors: Seon Uk Lee, Seongnam-si (KR); Sung Hwan Won, Suwon-si (KR); Dae Ho Lee, Seoul (KR); Sun Hwa Lee, Andong-si (KR); Kwang-Chul Jung, Seongnam-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 192 days.

(21) Appl. No.: 14/151,727

(22) Filed: Jan. 9, 2014

(65) Prior Publication Data

US 2014/0354921 A1    Dec. 4, 2014

(30) Foreign Application Priority Data

May 31, 2013   (KR) .......................... 10-2013-0063042

(51) Int. Cl.
 *G02F 1/1339*  (2006.01)
 *G02F 1/1341*  (2006.01)
 *G02F 1/1333*  (2006.01)

(52) U.S. Cl.
 CPC ....... *G02F 1/1341* (2013.01); *G02F 1/133377* (2013.01); *G02F 1/13392* (2013.01)

(58) Field of Classification Search
 CPC G02F 1/0107; G02F 1/133377; G02F 1/1339; G02F 1/13392
 See application file for complete search history.

(56) References Cited

U.S. PATENT DOCUMENTS

| | | | |
|---|---|---|---|
| 8,212,975 B2 * | 7/2012 | Fujiyoshi | G02F 1/13394 349/106 |
| 2012/0057091 A1 * | 3/2012 | Kawabata | G02F 1/13439 349/38 |

FOREIGN PATENT DOCUMENTS

KR   10-2012-0026880    3/2012

* cited by examiner

*Primary Examiner* — Paisley L Arendt
(74) *Attorney, Agent, or Firm* — Innovation Counsel LLP

(57) ABSTRACT

A display device may include a first subpixel electrode; a first roof layer; a first liquid crystal layer disposed between the first subpixel electrode and the first roof layer; and a first support member overlapping a first end portion of the first roof layer in a first direction. The display device may further include a second subpixel electrode immediately neighboring the first subpixel electrode; a second roof layer; a second liquid crystal layer disposed between the second subpixel electrode and the second roof layer; and a second support member overlapping a first end portion of the second roof layer in the first direction. The first end portion of the first roof layer and the first end portion of the second roof layer may be disposed between a second end portion of the first roof layer and a second end portion of the second roof layer.

11 Claims, 14 Drawing Sheets

DISPLAY DEVICE HAVING ROOF LAYERS AND MANUFACTURING METHOD OF THE DISPLAY DEVICE

CROSS-REFERENCE TO RELATED APPLICATION

This application claims priority to and the benefit of Korean Patent Application No. 10-2013-0063042 filed in the Korean Intellectual Property Office on May 31, 2013, the entire contents of which are incorporated herein by reference.

BACKGROUND (a) Technical Field

The present invention relates to a display device and a manufacturing method thereof.

(b) Description of the Related Art

A liquid crystal display typically includes two field generating electrodes, such as a pixel electrode and a common electrode, and a liquid crystal layer interposed therebetween. The field generating electrodes may generate an electric field in the liquid crystal layer to determine an orientation of liquid crystal molecules of the liquid crystal layer for controlling transmission of incident light, thereby displaying images.

A conventional liquid crystal display typically requires a thin film transistor array panel and an opposite panel. The thin film transistor array panel may include a gate line (configured for transferring a gate signal), and a data line (configured for transferring a data signal), a thin film transistor connected to the gate line and the data line, and a pixel electrode connected to the thin film transistor. The opposite panel may include a light blocking member, a color filter, and a common electrode. In some cases, the light blocking member, the color filter, and the common electrode may be included in the thin film transistor array panel.

Each of the thin film transistor array panel and the opposite panel may require at least one substrate. The two substrates may undesirably contribute to the weight, the manufacturing cost, and/or the manufacturing time of the liquid crystal display.

The above information disclosed in this Background section is for enhancement of understanding of the background of the invention. The Background section may contain information that does not form the prior art that is already known in this country to a person of ordinary skill in the art.

SUMMARY

Embodiments of the present invention may be related to a display device that requires only one substrate. Advantageously, the weight, the thickness, the cost, and/or the manufacturing time associated the display device may be minimized.

Embodiments of the present invention may be related to a method for manufacturing a display device. In the method, obstruction against material injection may be avoided and/or minimized. Advantageously, the manufacturing time and cost associated with the display device may be minimized.

An embodiment of the present invention may be related to a display device that may include a first subpixel electrode; a first roof layer; a first liquid crystal layer disposed between the first subpixel electrode and the first roof layer; and a first support member overlapping a first end portion of the first roof layer in a first direction and overlapping the first liquid crystal layer in a second direction. The first direction may be substantially perpendicular to a surface (e.g., a top surface) of the roof layer. The second direction may be substantially perpendicular to the first direction. The display device may further include a second subpixel electrode immediately neighboring the first subpixel electrode without any subpixel electrode being disposed between the first subpixel electrode and the second subpixel electrode; a second roof layer; a second liquid crystal layer disposed between the second subpixel electrode and the second roof layer; and a second support member overlapping a first end portion of the second roof layer in the first direction and overlapping the second liquid crystal layer in the second direction. The first end portion of the first roof layer and the first end portion of the second roof layer may be disposed between a second end portion of the first roof layer and a second end portion of the second roof layer.

Support members that include the first support member and the second support member may provide sufficient structural support for other elements (such as roof layers) of the display device. Therefore, the display device may require only one substrate.

The second end portion of the first roof layer may not overlap, in the first direction, any support member that is analogous to the first support member or the second support member. The second end portion of the second roof layer may not overlap, in the first direction, any support member that is analogous to the first support member or the second support member.

The display device may further include a third subpixel electrode, which may immediately neighbor the second subpixel electrode without any subpixel electrode being disposed between the second subpixel electrode and the third subpixel electrode. The second subpixel electrode may be disposed between the first subpixel electrode and the third subpixel electrode. The second roof layer may overlap both the second subpixel electrode and the third subpixel electrode. A center portion of the second roof layer may be disposed between the first end portion of the second roof layer and the second end portion of the second roof layer. The center portion of the second roof layer may not overlap, in the first direction, any support member that is analogous to the first support member or the second support member.

The display device may further include a fourth subpixel electrode, which may immediately neighbor the third subpixel electrode without any subpixel electrode being disposed between the third subpixel electrode and the fourth subpixel electrode. The display device may further include a third roof layer, which may overlap the fourth subpixel electrode in the first direction. The third subpixel electrode may be disposed between the second subpixel electrode and the fourth subpixel electrode. The second end portion of the second roof layer and a first end portion of the third roof layer may be disposed between the first end portion of the second roof layer and a second end portion of the third roof layer. The first end portion of the third roof layer may not overlap, in the first direction, any support member that is analogous to the first support member or the second support member.

The display device may further include a third support member, which may overlap the second end portion of the third roof layer in the first direction.

A length of the first support member in the first direction may be larger than a thickness of first subpixel electrode in the first direction.

The display device may include a step member disposed between the first support member and the first roof layer. A width of the step member in the second direction may be larger than a width of the first support member in the second direction.

The first support member, the first roof layer, and the step member may be made of a same material.

The first support member may overlap the first subpixel electrode in the first direction. The display device may include an insulating layer disposed between the first support member and the first subpixel electrode.

The second support member may not overlap the second subpixel electrode in the first direction.

The first support member may not overlap the first subpixel electrode in the first direction.

An embodiment of the present invention may be related to a method for manufacturing a display device. The method may include the following steps: forming a first subpixel electrode and a second subpixel electrode, wherein the second subpixel electrode may immediately neighbor the first subpixel electrode without any subpixel electrode being disposed between the first subpixel electrode and the second subpixel electrode; forming a first roof layer and a second roof layer; forming a first support member and a second support member, wherein the first support member may overlap a first end portion of the first roof layer in a first direction, wherein the second support member may overlap a first end portion of the second roof layer in the first direction, and wherein the first end portion of the first roof layer and the first end portion of the second roof layer may be disposed between a second end portion of the first roof layer and a second end portion of the second roof layer; and forming a first cavity and a second cavity, wherein a portion of the first cavity is positioned between the first subpixel electrode and the first roof layer, and wherein a first portion of the second cavity is positioned between the second subpixel electrode and the second roof layer.

The second end portion of the first roof layer may not overlap, in the first direction, any support member that is analogous to the first support member or the second support member. The second end portion of the second roof layer may not overlap, in the first direction, any support member that is analogous to the first support member or the second support member.

The method may further include the following step: forming a third subpixel electrode, which may immediately neighbor the second subpixel electrode without any subpixel electrode being disposed between the second subpixel electrode and the third subpixel electrode. The second subpixel electrode may be disposed between the first subpixel electrode and the third subpixel electrode. The second roof layer may overlap both the second subpixel electrode and the third subpixel electrode. A second portion of the second cavity may be positioned between the third subpixel electrode and the second roof layer. A center portion of the second roof layer may be disposed between the first end portion of the second roof layer and the second end portion of the second roof layer. The center portion of the second roof layer may not overlap, in the first direction, any support member that is analogous to the first support member or the second support member.

The method may further include the following steps: forming a fourth subpixel electrode, which may immediately neighbor the third subpixel electrode without any subpixel electrode being disposed between the third subpixel electrode and the fourth subpixel electrode; forming a third roof layer, which may overlap the fourth subpixel electrode in the first direction; and forming a third cavity. A portion of the third cavity may be positioned between the fourth subpixel electrode and the third roof layer. The third subpixel electrode may be disposed between the second subpixel electrode and the fourth subpixel electrode. The second end portion of the second roof layer and a first end portion of the third roof layer may be disposed between the first end portion of the second roof layer and a second end portion of the third roof layer. The first end portion of the third roof layer may not overlap, in the first direction, any support member that is analogous to the first support member or the second support member.

The method may further include the following step: forming a third support member, which may overlap the second end portion of the third roof layer in the first direction.

The method may include the following steps: providing a liquid crystal material through a gap between the second roof layer and the third roof layer to the second cavity and the third cavity; and preventing providing any liquid crystal material through a gap between the first roof layer and the second roof layer.

The method may include the following steps: providing an alignment layer material through a gap between the second roof layer and the third roof layer to the second cavity and the third cavity; and preventing providing any alignment layer material through a gap between the first roof layer and the second roof layer.

The method may include the following step: forming a step member between the first support member and the first roof layer. A width of the step member in a second direction may be larger than a width of the first support member in the second direction.

The method may include the following step: forming the first support member, the first roof layer, and a step member between the first support member and the first roof layer using a same material.

The first support member may overlap the first subpixel electrode in the first direction. The method may include the following step: forming an insulating layer between the first support member and the first subpixel electrode.

The first support member may not overlap the first subpixel electrode in the first direction.

An embodiment of the present invention may be related to a display device that may include the following elements: a substrate including a plurality of pixel areas; a thin film transistor formed on the substrate; a pixel electrode connected to the thin film transistor and formed in the pixel area; a roof layer formed on the pixel electrode to be spaced apart from the pixel electrode with a microcavity; an injection hole formed at the roof layer so as to expose a part of the microcavity; a support member adjacent to the injection hole and formed in a column shape in the microcavity; a liquid crystal layer filling the microcavity; and an encapsulation layer formed on the roof layer so as to cover the injection hole to seal the microcavity, in which support members are formed at opposite edges of the two adjacent microcavities, respectively.

Injection holes may be formed at two opposite edges of each microcavity. A support member may be formed at one of the two opposite edges of each microcavity, and not be formed at the other edge.

The microcavities may be disposed in a matrix form, and a first valley may be disposed between the microcavities positioned in two immediately neighboring rows.

Support members may be formed along two sides of a first valley.

Support members may be formed along two sides of only one first valley of two immediately neighboring first valleys.

The display device may further include a step member formed between a support member and a roof layer associated with the support member. The step member may be wider than the support member.

The support member, the roof layer, and the step member may be made of the same material.

A plurality of support members may be formed at one edge of each microcavity.

The display device may further include an insulating layer formed between a support member and a pixel electrode, wherein the support member overlaps the pixel electrode.

A support member may not overlap a pixel electrode that is associated with the support member.

An embodiment of the present invention may be related to a method for manufacturing a display device. The method may include the following steps: forming a thin film transistor on a substrate including a plurality of pixel areas; forming a pixel electrode connected to the thin film transistor in the pixel area; forming a sacrificial layer on the pixel electrode; forming an opening by removing a part of the sacrificial layer; forming a roof layer on the sacrificial layer and forming a support member in the opening; forming an injection hole by patterning the roof layer so that a part of the sacrificial layer is exposed; forming a microcavity between the pixel electrode and the roof layer by removing the sacrificial layer; forming a liquid crystal layer in the microcavity by injecting a liquid crystal material through the injection hole; and forming an encapsulation layer on the roof layer to seal the microcavity, in which the support members are formed at opposite edges of the two adjacent microcavities, respectively.

The support member may be adjacent to the injection hole and may be formed in a column shape.

Injection holes may be formed at two opposite edges of each microcavity. A support member may be formed at only one of the two opposite edges of each microcavity, and no analogous support member may be formed at the other edge. In the forming of the liquid crystal layer, the liquid crystal material may be injected into the injection hole positioned at the edge of the microcavity where no support member is formed.

The microcavities may be disposed in a matrix form, and a first valley may be disposed between microcavities positioned in two immediately neighboring rows.

Support member may be formed along two sides of a first valley.

Support member may be formed along two sides of only one first valley of two immediately neighboring first valleys. In the forming of the liquid crystal layer, the liquid crystal material may be supplied to the first valley where no support member is formed.

The pixel area may be disposed in a matrix form including a plurality of pixel rows and a plurality of pixel columns. In the forming of the opening, a sacrificial layer positioned between the plurality of pixel columns may be removed together, and the roof layer may be formed between the plurality of pixel columns to cover a side of the microcavity.

In the forming of the opening, a groove portion may be formed in the sacrificial layer by slit-exposing or halftone-exposing the surroundings of the opening. In the forming of the roof layer and the support member, a step member may be formed in the groove portion.

The step member may be wider than the support member and may be disposed between the support member and the roof layer.

The support member, the roof layer, and the step member may be made of the same material during the same process.

DETAILED DESCRIPTION OF THE EMBODIMENTS

Figure 1:
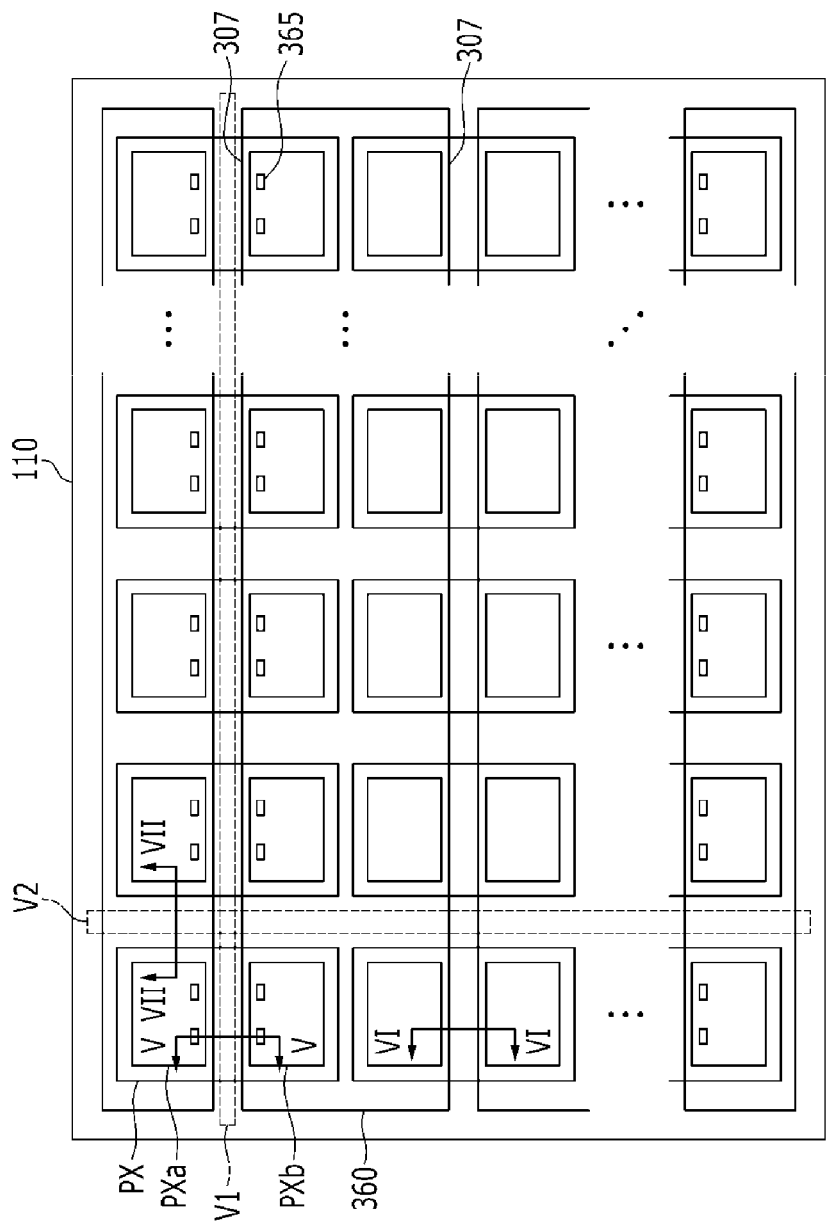
FIG. 1 is a plan view illustrating a display device according to an embodiment of the present invention.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

In the drawings, the thicknesses of layers, films, panels, regions, etc., may be exaggerated for clarity. Like reference numerals may designate like elements in the specification. If an element such as a layer, film, region, or substrate is referred to as being "on" another element, it can be directly on the other element, or at least one intervening element may also be present. In contrast, if an element is referred to as being "directly on" another element, there are no intended intervening elements (except one or more environmental elements, such as air) present.

Although the terms first, second, etc. may be used herein to describe various signals, elements, components, regions, layers, and/or sections, these signals, elements, components, regions, layers, and/or sections should not be limited by these terms. These terms may be used to distinguish one signal, element, component, region, layer, or section from another signal, region, layer, or section. Thus, a first signal, element, component, region, layer, or section discussed below may be termed a second signal, element, component, region, layer, or section without departing from the teachings of the present invention. The description of an element as a "first" element may not require or imply the presence of a second element or other elements. The terms first, second, etc. may also be used herein to differentiate different categories of elements. For conciseness, the terms first, second, etc. may represent first-type (or first-category), second-type (or second-category), etc., respectively.

In the description, the term "connect" may mean "electrically connect"; the term "insulate" may mean "electrically insulate".

Figure 2:
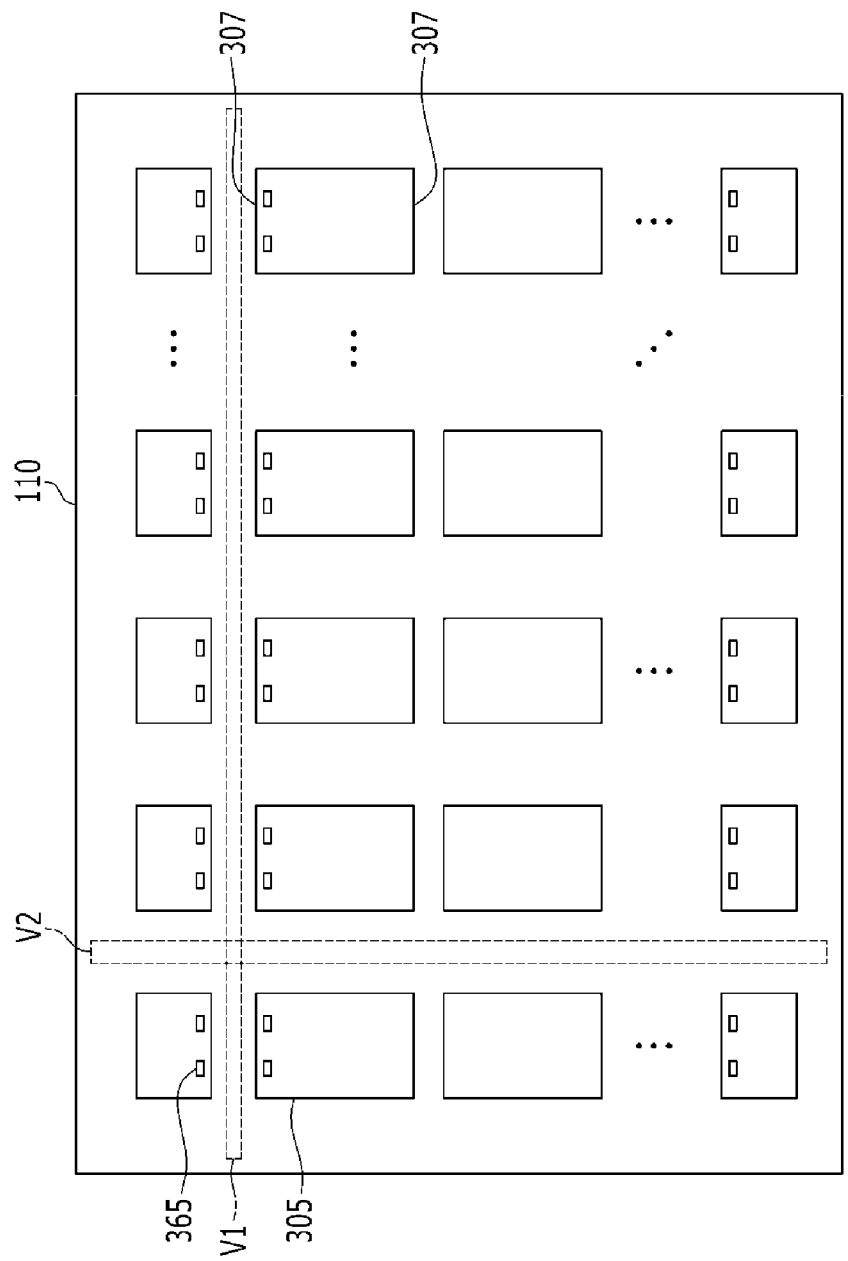
FIG. 2 is a plan view illustrating a display device according to an embodiment of the present invention.

FIG. 1 is a plan view illustrating a display device according to an embodiment of the present invention. FIG. 2 is a plan view illustrating a display device according to an embodiment of the present invention. For clarity of illustration and discussion, only some constituent elements are illustrated in FIGS. 1 and 2. In the display device illustrate in FIG. 1, formation positions of support members may be based on a plurality of pixel areas. In the display device illustrated in FIG. 2, formation positions of support members may be based on a plurality of microcavities.

A display device according to an embodiment of the present invention includes a substrate 110 and a roof layer 360 formed on the substrate 110. The substrate may be made of at least one of glass and plastic.

The substrate 110 includes a plurality of pixel areas PX. The plurality of pixel areas PX may form a matrix that includes a plurality of pixel rows and a plurality of pixel columns. Each pixel area PX may include a first subpixel area PXa and a second subpixel area PXb. The first subpixel area PXa and the second subpixel area PXb may be substantially vertically disposed and/or may be aligned in a pixel column direction.

A first valley V1 is positioned between the first subpixel area PXa and the second subpixel area PXb in a pixel row direction, and a second valley V2 is positioned between two immediately neighboring pixel columns.

Portions of the roof layer 360 may be formed along the plurality of pixel rows. In an embodiment, the first valley V1 may be positioned between two immediately neighboring portions of the roof layer 360 and thus may enable access through at least an injection hole 307 to at least a microcavity 305 covered by the roof layer 360 during manufacturing of the display device.

Each of the first subpixel area PXa and the second subpixel area PXb may be associated with an injection hole 307, which may be an opening that allows access to a microcavity 305. An injection hole 307 may correspond to a lower side of the first subpixel area PXa, and an injection hole 307 may correspond to an upper side of the second subpixel area PXb. The two injection holes 307 may face each other.

A support member 365 may be adjacent to the injection hole 307 and may be below the roof layer 360. According to an embodiment of the present invention, the support member 365 may support the roof layer 360. Advantageously, potential sagging of the roof layer 360 around the injection hole 307 may be prevented.

Two support members 365 may be formed at opposite edges of two opposite microcavities 305, respectively. The plurality of microcavities 305 is disposed in a matrix form, and each microcavity may correspond to a subpixel area. The microcavity 305 may have a substantially quadrangular shape in a plan view of the display device. A first injection hole 307 for accessing a first microcavity 305 that corresponds to a first subpixel area PXa may face a second injection hole 307 for accessing a second microcavity 305 that corresponds to a second subpixel area PXb that faces the first subpixel area PXa. In an embodiment, a first support member 365 may be disposed adjacent to the first injection hole 307 for reinforcing the first microcavity 305, and a second support member 365 may be disposed adjacent to the second injection hole 307 for reinforcing the second microcavity 305. The first injection hole 307 and the second injection hole 307 may be positioned between the first support member 365 and the second support member 365.

A first microcavity 305 may correspond to a first pixel area PXa, and a second microcavity 305 may correspond to a second pixel area PXb. A first edge of the first microcavity 305 and a first edge of the second microcavity 305 may be positioned between a second edge of the first microcavity 305 and a second edge of the second microcavity 305.

In an embodiment, a first injection hole 307 and a first support member 365 may be formed at the first edge of the first microcavity 305, and a second injection hole 307 and a second support member may be formed at the first edge of the second microcavity 305.

In an embodiment, no support member 365 is formed at the second edge of the first microcavity 305 or at the second edge of the second microcavity 305.

In an embodiment, a first injection hole 307 and a first support member 365 may be formed at the first edge of the first microcavity 305, and a second injection hole 307 and a second support member may be formed at the second edge of the first microcavity 305.

In an embodiment, no support member 365 is formed at the first edge of the second microcavity 305 or at the second edge of the second microcavity 305.

In an embodiment, a first injection hole 307 and a first support member 365 may be formed at the second edge of the first microcavity 305, and a second injection hole 307 and a second support member may be formed at the second edge of the second microcavity 305.

In an embodiment, no support member 365 is formed at the first edge of the first microcavity 305 or at the first edge of the second microcavity 305.

In an embodiment, an upper edge and a lower edge of a microcavity 305 may be substantially parallel to each other, and at least an injection hole 307 and at least a support member 365 neighboring the injection hole 307 may be formed at each of an upper side and a lower side of the microcavity 305.

In an embodiment, support members 365 may be formed at the lower edges of the microcavities 305 in the odd numbered rows, but no support members 365 are formed at the upper edges of the microcavities 305 in the odd numbered rows.

In an embodiment, support members 365 may be formed at the upper edge of the microcavity 305 in the even numbered rows, but no support members 365 are formed at the lower edges of the microcavity 305 in the even numbered rows.

A first valley V1 is positioned between two immediately neighboring microcavities 305 that positioned in different rows. In an embodiment, support members 365 may be adjacent to and correspond to each of two sides of a first first valley V1, and no support member 365 may be adjacent to or correspond to the sides of a second first valley V1 that immediately neighbors the first first valley V1.

In an embodiment, one microcavity 305 may be formed in each of a first subpixel area PXa and a second subpixel area PXb. In an embodiment, only one microcavity 305 may be formed in each pixel area PX.

Figure 3:
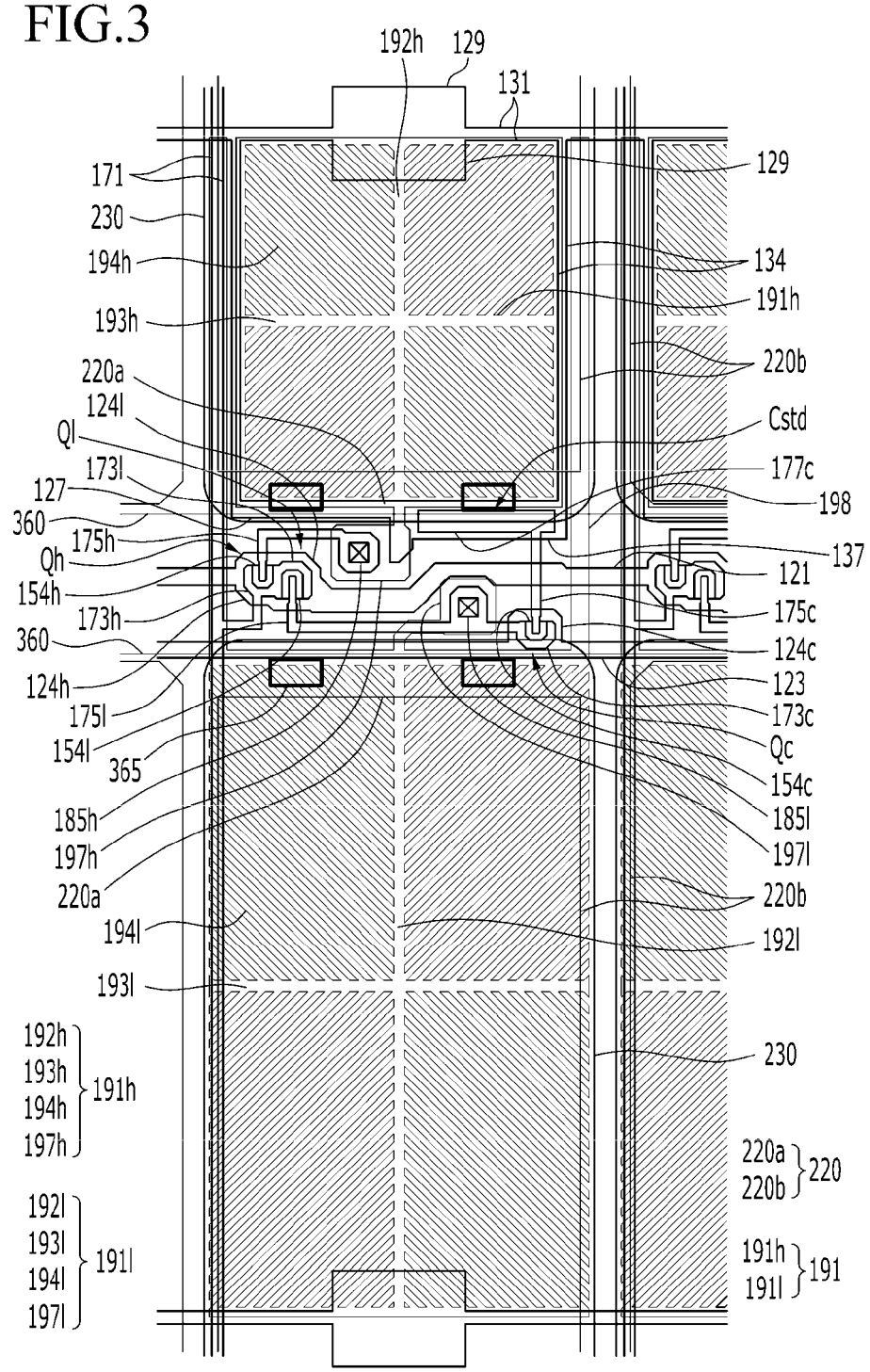
FIG. 3 is a plan view illustrating a pixel of a display device according to an embodiment of the present invention.
Figure 4:
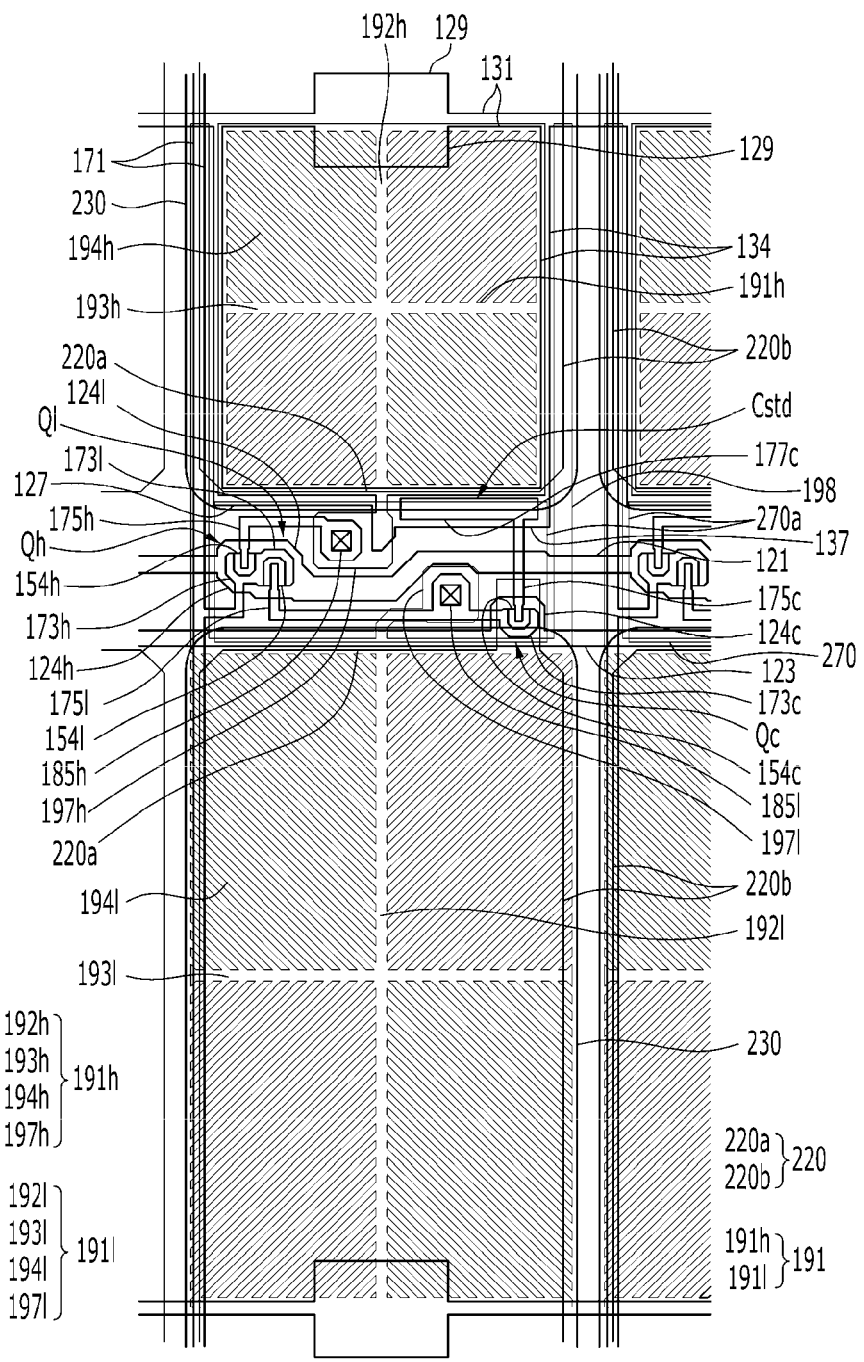
FIG. 4 is a plan view illustrating a pixel of a display device according to an embodiment of the present invention.
Figure 5:
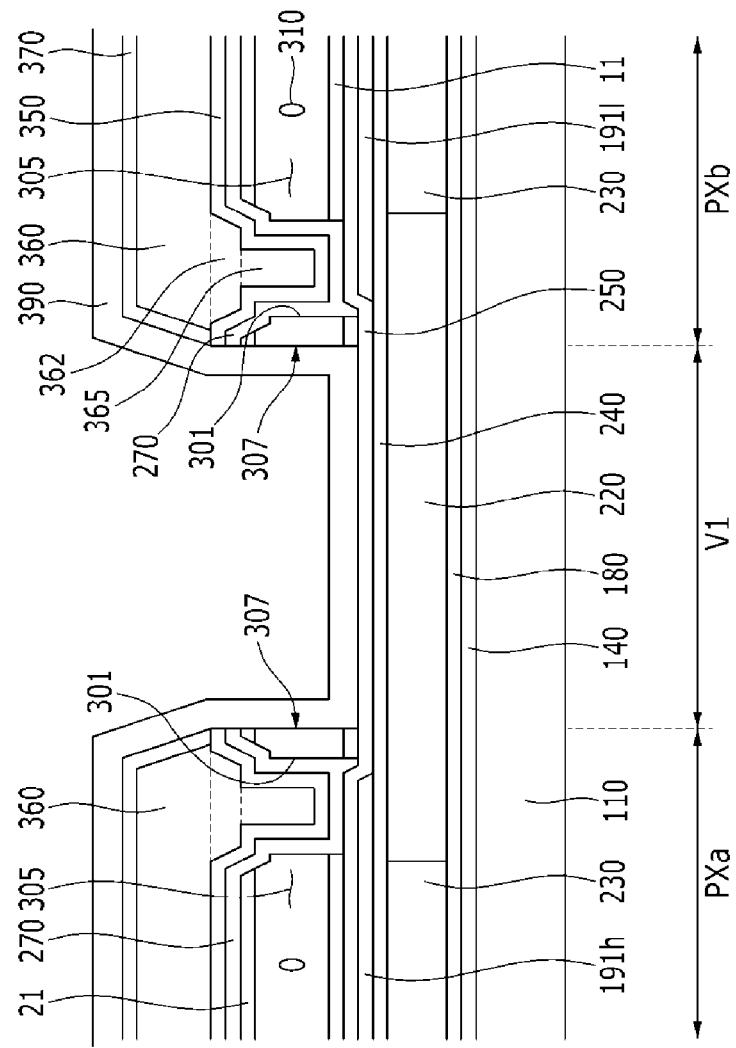
FIG. 5 is a cross-sectional view taken along line V-V indicated in FIG. 1 according to an embodiment of the present invention.
Figure 6:
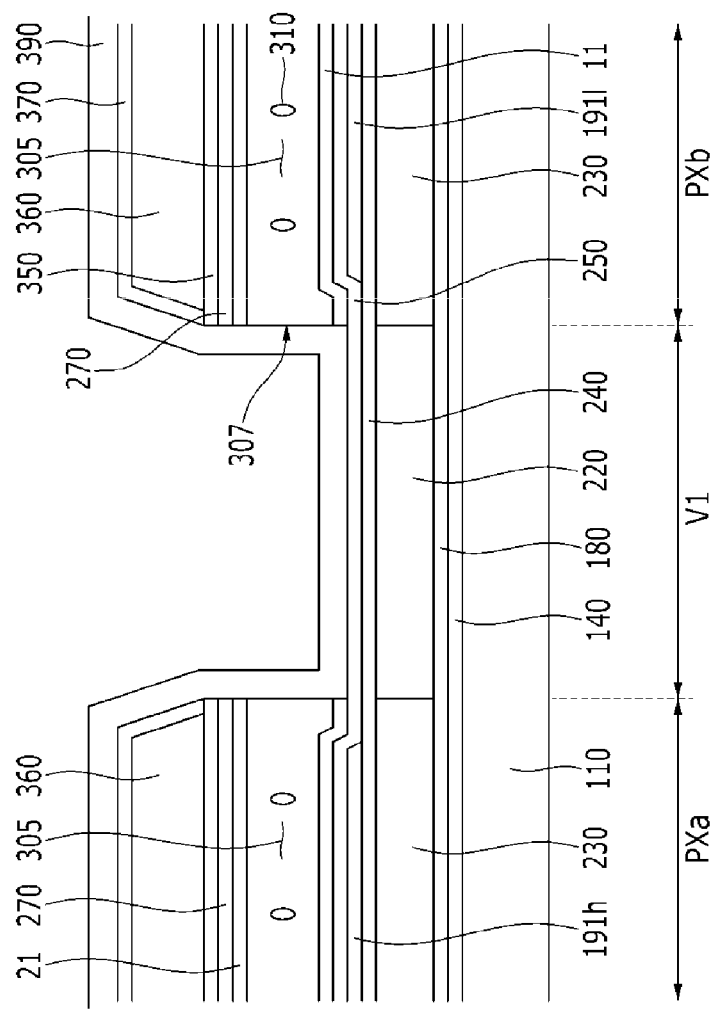
FIG. 6 is a cross-sectional view taken along line VI-VI indicated in FIG. 1 according to an embodiment of the present invention.
Figure 7:
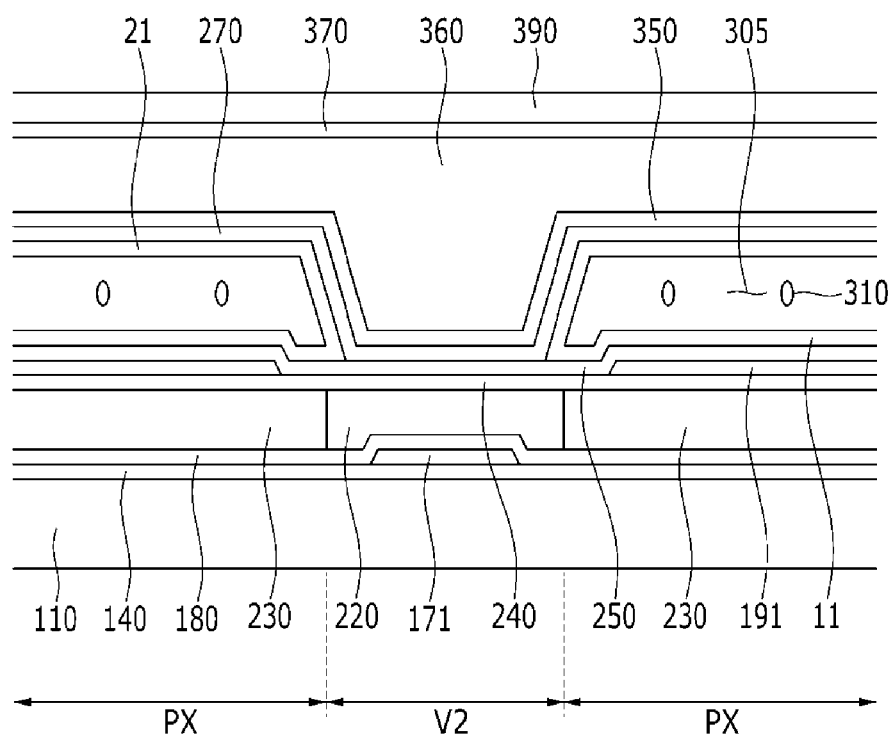
FIG. 7 is a cross-sectional view taken along line VII-VII indicated in FIG. 1 according to an embodiment of the present invention.

FIG. 3 is a plan view illustrating a pixel of a display device according to an embodiment of the present invention. FIG. 4 is a plan view illustrating a pixel of a display device according to an embodiment of the present invention. FIG. 5 is a cross-sectional view taken along line V-V indicated in FIG. 1 according to an embodiment of the present invention. FIG. 6 is a cross-sectional view taken along line VI-VI indicated in FIG. 1 according to an embodiment of the present invention. FIG. 7 is a cross-sectional view taken along line VII-VII indicated in FIG. 1 according to an embodiment of the present invention FIGS. 3 and 5 illustrate a pixel in which support members are formed at edges of microcavities. FIGS. 4 and 6 illustrate a pixel in which no support members are formed at edges of microcavities.

Referring to FIGS. 1 to 7, a pixel may be associated with a plurality of gate conductors, including a gate line 121, a step-down gate line 123, and a storage electrode line 131, which may be formed on the substrate 110.

The gate line 121 and the set-down gate line 123 may mainly extend in a horizontal direction (or pixel row direction parallel to the first valley V1) and may transfer gate signals. The gate conductors may include a first gate electrode 124h and a second gate electrode 124I that protrude substantially upward and downward, respectively, from the gate line 121. The gate conductors may include a third gate electrode 124c that protrudes upward from the step-down gate line 123. The first gate electrode 124h and the second gate electrode 124l may be connected to and substantially aligned with each other in the pixel column direction and may form an enlarged portion of the gate line 121. The gate electrodes 124h, 124l, and 124c may have one or more other protrusion configurations.

Each storage electrode line 131 mainly extends in a horizontal direction (e.g., the pixel row direction) to transfer predetermined voltage such as common voltage Vcom. The storage electrode line 131 includes storage electrodes 129 that protrude upward and downward, a pair of vertical portions 134 that extends toward the gate line 121 and extends substantially vertical to the gate line 121, and a horizontal portion 127 that connects ends of the vertical portions 134. The horizontal portion 127 includes a capacitor electrode 137 that expands toward the gate line 121.

A gate insulating layer 140 is formed on (and may cover) the gate conductors 121, 123, 124h, 124l, 124c, and 131. The gate insulating layer 140 may be made of an inorganic insulating material, such as at least one of silicon nitride (SiNx) and silicon oxide (SiOx). The gate insulating layer 140 may have a single layer structure or a multiple layer structure.

A first semiconductor 154h, a second semiconductor 154l, and a third semiconductor 154c are formed on the gate insulating layer 140. The first semiconductor 154h may be positioned on the first gate electrode 124h, the second semiconductor 154l may be positioned on the second gate electrode 124I, and the third semiconductor 154c may be positioned on the third gate electrode 124c. The first semiconductor 154h and the second semiconductor 154l may be connected to each other, and the second semiconductor 154l and the third semiconductor 154c may be connected to each other. The first semiconductor 154h may overlap an extended portion of the data line 171. The semiconductors 154h, 154l, and 154c may be made of one or more of amorphous silicon, polycrystalline silicon, metal oxide, etc.

Ohmic contacts (not illustrated) may be formed on the semiconductors 154h, 154l, and 154c, respectively. The ohmic contacts may be made of silicide or a material (such as n+ hydrogenated amorphous silicon) in which an n-type impurity is doped at high concentration.

A pixel may be associated with a plurality of data conductors, including a data line 171, a first source electrode 173h, a second source electrode 173l, a third source electrode 173c, a first drain electrode 175h, a second drain electrode 175l, and a third drain electrode 175c. Some of the data conductors may be formed on the semiconductors 154h, 154l, and 154c.

The data line 171 may transfer a data signal. The data line 171 may mainly extend in a vertical direction (e.g., the pixel column direction) and may cross the gate lines 121 and the set-down gate lines 123. The data line 171 may include (or may be connected to) a first source electrode 173h and a second source electrode 173l, which correspond to (and/or extend toward) the first gate electrode 124h and the second gate electrode 124l, respectively, and are connected with each other.

Each of a first drain electrode 175h, a second drain electrode 175l, and a third drain electrode 175c may include a relatively wide portion and a relatively narrow rod-shaped portion. The rod-shaped portions of the first drain electrode 175h and the second drain electrode 175l are partially surrounded by the first source electrode 173h and the second source electrode 173l, respectively. The relatively wide portion of the second drain electrode 175l is connected to a third source electrode 173c, which has a 'U'-lettered shape. The relatively wide portion 177c of the third drain electrode 175c overlaps the capacitor electrode 137 to form a set-down capacitor Cstd, and the rod-shaped portion of the third drain electrode 175c is partially surrounded by the third source electrode 173c.

The first gate electrode 124h, the first source electrode 173h, and the first drain electrode 175h form a first thin film transistor Qh together with the first semiconductor 154h. The second gate electrode 124I, the second source electrode 173I and the second drain electrode 175I form a second thin film transistor QI together with the second semiconductor 154I. The third gate electrode 124c, the third source electrode 173c and the third drain electrode 175c form the third thin film transistor Qc together with the third semiconductor 154c.

The first semiconductor 154h, the second semiconductor 154I, and the third semiconductor 154c are connected to each other. One or more of the semiconductors 154h, 154I, and 154c may have substantially the same planar shape as one or more of the data conductors 173h, 173l, 173c, 175h, 175l, and 175c and one or more of the associated ohmic contacts, except for one or more channel regions between one or more of the source electrodes 173h, 173l, and 173c and one or more of the drain electrodes 175h, 175l, and 175c.

In the first semiconductor 154h, an exposed portion that is not covered by the first source electrode 173h and the first drain electrode 175h is disposed between the first source electrode 173h and the first drain electrode 175h in a plan view of the display device. In the second semiconductor 154l, an exposed portion that is not covered by the second source electrode 173l and the second drain electrode 175l is disposed between the second source electrode 173l and the second drain electrode 175l in the plan view of the display device. In the third semiconductor 154c, an exposed portion that is not covered by the third source electrode 173c and the third drain electrode 175c is disposed between the third source electrode 173c and the third drain electrode 175c.

A passivation layer 180 is formed on the data conductors 171, 173h, 173l, 173c, 175h, 175l, and 175c and portions of the semiconductors 154h, 154l, and 154c exposed between the respective source electrodes 173h, 173l, and 173c and the respective drain electrodes 175h, 175l, and 175c. The passivation layer 180 may be made of an organic insulating material or an inorganic insulating material. The passivation layer 18 may have a single layer structure or a multiple layer structure.

A color filter 230 in each pixel area PX is formed on the passivation layer 180. The color filter 230 may display one of primary colors and/or may display white. In an embodiment, the primary colors may be three primary colors of red, green and blue. In an embodiment the primary colors may include cyan, magenta, and yellow. In an embodiment, a color filter 230 may extend in a column direction along a space between immediately adjacent data lines 171.

A light blocking member 220 is formed in a region between immediately adjacent color filters 230 and/or between separated portions of color filters. The light blocking member 220 overlaps at least a boundary of the pixel area PX, the thin film transistors, and the support member 365 to prevent light leakage. A color filter 230 (or a portion of a color filter 230) is formed in each of the first subpixel area PXa and the second subpixel area PXb. A portion of the light blocking member 220 may be formed between the first subpixel area PXa and the second subpixel area PXb to cover the thin film transistors.

The light blocking member 220 includes a horizontal light blocking member 220a that extends along the gate line 121 and the step-down gate line 123 and covers the first thin film transistor Qh, the second thin film transistor Ql, and the third thin film transistor Qc. The light blocking member 220 further includes a vertical light blocking member 220b that extends along the data line 171. The horizontal light blocking member 220a may overlap the first valley V1, and the vertical light blocking member 220b may overlap the second valley V2. The color filter 230 and the light blocking member 220 may directly contact each other in a same layer of the display device and may both directly contact the passivation layer 180.

A first insulating layer 240 may be formed on the color filter 230 and the light blocking member 220. The first insulating layer 240 may be made of an inorganic insulating material, such as at least one of silicon nitride (SiNx) and silicon oxide (SiOx). The first insulating layer 240 serves to protect the color filter 230 (which may be made of an organic material) and the light blocking member 220. In an embodiment, the first insulating layer 240 may be omitted.

In the first insulating layer 240, the light blocking member 220, and the passivation layer 180, a first contact hole 185h and a second contact hole 185l are formed.

A pixel electrode 191 is formed on the first insulating layer 240. The pixel electrode 191 may be made of a transparent metal material, such as at least one of indium tin oxide (ITO) and indium zinc oxide (IZO). The pixel electrode 191 may be connected to drain electrodes through the contact holes 185h and 185l.

The pixel electrode 191 includes a first subpixel electrode 191h and a second subpixel electrode 191l, which are separated from each other with the gate line 121 and the step-down gate line 123 being disposed substantially between the subpixel electrodes 191h and 191l. The subpixel electrodes may be substantially aligned with each other in a column direction. The first subpixel electrode 191h and the second subpixel electrode 191l may be separated from each other with the first valley V1 being disposed therebetween in a plan view of the display device. The first subpixel electrode 191h is positioned in the first subpixel area PXa, and the second subpixel electrode 191l is positioned in the second subpixel area PXb.

The first subpixel electrode 191h and the second subpixel electrode 191l are connected to the first drain electrode 175h and the second drain electrode 175l through the first contact hole 185h and the second contact hole 185l, respectively. Accordingly, when the first thin film transistor Qh and the second thin film transistor Ql are turned on, the first subpixel electrode 191h and the second subpixel electrode 191l receive data voltages from the first drain electrode 175h and the second drain electrode 175l.

An overall shape of the first subpixel electrode 192h and the second subpixel electrode 191I may be substantially a quadrangle. The first subpixel electrode 191h and the second subpixel electrode 191I include cross stems. The cross stems include horizontal stems 193h and 193I and vertical stems 192h and 192I that cross the horizontal stems 193h and 193I, respectively. The first subpixel electrode 191h and the second subpixel electrode 191I may further include a plurality of minute branches 194h and 194I and may further include protrusions 197h and 197I protruding upward or downward from edge sides of the subpixel electrodes 191h and 191I, respectively.

Each of the subpixel electrodes 191h and 191l of the pixel electrode 191 is divided into four sub-regions by an associated one of the horizontal stems 193h and 193I and an associated one of the vertical stems 192h and 192I. The minute branches 194h and 194l obliquely extend from the horizontal stems 193h and 193l and the vertical stems 192h and 192l, extending at an angle of approximately 45 degrees or 135 degrees with respect to the gate line 121 or the horizontal stems 193h and 193l. In an embodiment, directions in which the minute branches 194h and 194I of the two adjacent sub-regions extend may be perpendicular to each other.

In an embodiment, the first subpixel electrode 191h may include an outer stem that surrounds at least some elements of the first subpixel electrode 191h. The second subpixel electrode 191I may include horizontal portions positioned at an upper end and a lower end of the second subpixel electrode 191l. The pixel electrode 191 may include left and right vertical portions 198 positioned at the left and the right of the first subpixel electrode 191h. The left and right vertical portions 198 may prevent capacitive coupling (or coupling) between the data line 171 and the first subpixel electrode 191h.

The layout form of the pixel area, the structure of the thin film transistor, and the shape of the pixel electrode described above are examples and may be modified in various embodiments.

A second insulating layer 250 may be formed on the pixel electrode 191. The second insulating layer 250 may be made of an inorganic insulating material, such as at least one of silicon nitride (SiNx) and silicon oxide (SiOx). The second insulating layer 250 serves to protect the pixel electrode 191. In an embodiment, the second insulating layer 250 may be omitted.

A common electrode 270 may overlap the pixel electrode 191 and may be spaced from the pixel electrode 191 at a predetermined distance. A microcavity 305 is formed between the pixel electrode 191 and the common electrode 270. The microcavity 305 may be substantially surrounded by at least one of the pixel electrode 191 and the common electrode 270. A width and an area of the microcavity 305 may be configured according to a size and resolution of the display device.

The second insulating layer 250 may prevent the common electrode 270 and the pixel electrode 191 from contacting each other and/or from being short-circuited.

In an embodiment, the common electrode 270 may be formed directly on the second insulating layer 250. No microcavity 305 may be formed between the pixel electrode 191 and common electrode 270. The common electrode 270 may be positioned between pixel electrode 191 and a microcavity 305 and/or may be positioned between the second insulating layer 250 and a microcavity 305.

The common electrode 270 may be made of a transparent metal material, such as at least one of indium tin oxide (ITO) and indium zinc oxide (IZO). A predetermined voltage may be applied to the common electrode 270, and an electric field may be generated between the pixel electrode 191 and the common electrode 270.

A first alignment layer 11 may overlap the pixel electrode 191. The first alignment layer 11 may also be formed directly on a portion of the second insulating layer 250 such that the portion of the second insulating layer 250 is disposed between the first alignment layer 11 and the pixel electrode 191.

A second alignment layer 21 is formed on the common electrode 270. The second alignment layer 21 is disposed between the common electrode 270 the first alignment layer 11.

The first alignment layer 11 and the second alignment layer 21 may be vertical alignment layers and may be made of alignment materials, such as at least one of polyamic acid, polysiloxane, and polyimide. The alignment layers 11 and 21 may be connected to each other at an edge of the pixel area PX.

A liquid crystal layer that includes liquid crystal molecules 310 is formed in the microcavity 305 and is positioned between the pixel electrode 191 and the common electrode 270. The liquid crystal molecules 310 may have negative dielectric anisotropy and may be oriented in a vertical direction that is substantially perpendicular to the substrate 110 (i.e., in vertical alignment) when no electric field is applied to the pixel electrode 191.

The first subpixel electrode 191h and the second subpixel electrode 191l to which the data voltage is applied may generate an electric field together with a common electrode 270 to determine directions of the liquid crystal molecules 310. The luminance of light that is transmitted through the liquid crystal layer may be substantially determined by the directions (or orientations) of the liquid crystal molecules 310.

A third insulating layer 350 may be formed on the common electrode 270. The third insulating layer 350 may be made of an inorganic insulating material, such as at least one of silicon nitride (SiNx) and silicon oxide (SiOx). In an embodiment, the third insulating layer 350 may be omitted.

A roof layer 360 is formed on the third insulating layer 350. The roof layer 360 may be made of an organic material. The microcavity 305 is formed below the roof layer 360, and the roof layer 360 is hardened by a curing process to maintain a shape of the microcavity 305. The microcavity 305 may be positioned between the roof layer 360 and the pixel electrode 191.

The roof layer 360 is formed in each pixel area PX and the second valley V2 along a pixel row, and is not formed in the first valley V1. That is, the roof layer 360 is not formed between the first subpixel area PXa and the second subpixel area PXb. The microcavity 305 is formed below each roof layer 360 in each of the first subpixel area PXa and the second subpixel area PXb. In the second valley V2, a portion of the roof layer 360 is disposed between two portions of the microcavity 305. A thickness of the portion of the roof layer 360 positioned at the second valley V2 may be larger than a thickness of other portions of the roof layer 360 positioned in each of the first subpixel area PXa and the second subpixel area PXb. An upper surface and sides of the microcavity 305 may be covered by the roof layer 360.

An injection hole 307 for exposing a part of (and/or for access to) the microcavity 305 is formed in the roof layer 360. Injection holes 307 may face each other at edges of the first subpixel area PXa and the second subpixel area PXb. For example, a first injection hole 307 may correspond to a lower side of the first subpixel area PXa to allow access to a first microcavity 305 that overlaps the first subpixel electrode 191h, and a second injection hole 307 may correspond to an upper side of the second subpixel area PXb to allow access to a second microcavity 305 that overlaps the second pixel electrode 191l. The first injection hole 307 may be positioned at a first edge of the first microcavity 305. The second injection hole may be positioned at a first edge of the second microcavity 305. The first edge of the first microcavity 305 and the first edge of the second microcavity 305 may be disposed between a second edge of the first microcavity 305 and a second edge of the second microcavity 305.

Since the microcavity 305 is exposed by the injection hole 307, an aligning agent and/or or a liquid crystal material may be injected into the microcavity 305 through the injection hole 307.

A support member 365 may be disposed adjacent to the injection hole 307, may have a column shape, and may be disposed at an edge of a microcavity 305. As illustrated in FIGS. 3 and 5, support members 365 are formed at immediately neighboring edges of two immediately neighboring microcavities 305.

Two injection holes 307 may allow access to a same microcavity 305. For example, a first injection hole 307 may be positioned at a first edge (e.g., an upper edge) of a microcavity 305, and a second injection hole may be positioned at a second edge (e.g., a lower edge) of the same microcavity 305. One or more support members 365 may be formed at only one of the first injection hole 307 and the second injection hole 307, and no support member 365 may be formed at the other one of the first injection hole 307 and the second injection hole 307. For example, a support member 365 may be formed to be adjacent to the first injection hole 307 positioned at the upper edge of a microcavity 305, and no support member 365 corresponds to the second injection hole 307 positioned at the lower edge of the microcavity 305.

As illustrated in FIGS. 1, 3, and 5, support members 365 are adjacent to (and/or correspond to) two sides of the odd numbered first valleys V1. As illustrated in FIGS. 1, 4, and 6, no support members 365 are adjacent to (or correspond to) sides of the even numbered first valleys V1. In an embodiment, support members 365 may be adjacent to two sides of the even numbered first valleys V1, and no support members 365 may be adjacent to sides of the odd numbered first valleys V1.

The first alignment layer 11 and the second alignment layer 21 may be formed by injecting an aligning agent (or an alignment material). Solids of the aligning agent may concentrate near supporting member 365 during a drying process. In an embodiment, since the support members 365 are positioned at an edge of a microcavity 305, the concentrated solids of the aligning agent may not substantially block light that is transmitted through the liquid crystal layer. Therefore, the concentrated solids of the alignment agent may not significant influence the image display quality of the display device. In an embodiment, the light blocking member 220 may overlap support members 365 and may substantially overlap concentrated solids of the aligning agent, such that influence of the concentrated solids of the aligning agent on image display quality may be minimized. Since supporting members are formed at an edge of a microcavity 305, an area of a pixel that is overlapped by the light blocking member 220 may be minimized. Advantageously, an aperture ratio may be maximized.

The concentrated solids of the aligning agent might exert a force on the roof layer and might potentially cause deformation of the roof layer 360 if the roof layer 360 were not properly supported. In an embodiment, since a support member 365 is adjacent to the concentrated solids of the aligning agent, the support member 365 may properly support the roof layer 360. Advantageously, deformation of the roof layer 360 may be prevented.

A support member 365 is connected to the roof layer 360 and may be made of the same material as the roof layer 360. A portion of the third insulating layer 350 and/or a portion of the common electrode 270 may be positioned between the support member 365 and at least one of the second insulation layer 250 and a pixel electrode (e.g., 191h or 191l). The support member 365 may overlap the pixel electrode 191, which overlaps and is insulated from the common electrode 270.

In an embodiment, a support member 365 may be made of a material that is different from the material of the roof layer 360. In an embodiment, a support member 365 may be formed directly on (and may directly contact) one or more of the pixel electrode 191, the second insulating layer 250, and the first insulating layer 240.

A plurality of support members 365 may be formed at one edge of a microcavity 305. For example, two or more support members 365 may be formed at an edge of each microcavity 305. In an embodiment, a size of a microcavity 305 and/or a size of a support member 365 are considered in determining the number of support members 365 formed in each microcavity 305.

The shape of a support member 365 may be a quadrangle in a plan view of a pixel. In an embodiment, one or more support members 365 may be formed in one or more of various shapes, such as a circle and a triangle.

A step member 362 may be formed between a support member 365 and a roof layer 360. The step member 362 may have a larger width than the support member 365 in a plan view of the display device. The step member 362 may be made of the same material as the support member 365. In an embodiment, all of the step member 362, the support member 365, and the roof layer 360 may be made of the same material.

A fourth insulating layer 370 may be further formed on the roof layer 360. The fourth insulating layer 370 may be made of an inorganic insulating material, such as at least one of silicon nitride (SiNx) and silicon oxide (SiOx). The fourth insulating layer 370 may be formed to cover the top and the side of the roof layer 360. The fourth insulating layer 370 serves to protect the roof layer 360 (which may be made of an organic material). In an embodiment, the fourth insulating layer 370 may be omitted.

An encapsulation layer 390 may be formed on the fourth insulating layer 370. The encapsulation layer 390 is formed to cover the injection hole 307, where a part of the microcavity 305 is exposed. The encapsulation layer 390 may seal the microcavity 305 so that the liquid crystal molecules 310 in the microcavity 305 are retained inside microcavity 305 without undesirable leakage. In an embodiment, the encapsulation layer 390 may directly contact some of the liquid crystal molecules 310, and the encapsulation layer 390 may be made of a material that does not substantially (chemically) react with liquid crystal molecules 310. For example, the encapsulation layer 390 may be made of parylene and/or one or more materials that have analogous properties.

The encapsulation layer 390 may have a multilayer, such as a double layer structure of a triple layer structure. The double layer structure may include two layers made of different materials. The triple layer structure may include three layers, wherein materials of adjacent layers are different from each other. For example, the encapsulation layer 390 may include a layer made of an organic insulating material and may include a layer made of an inorganic insulating material.

Although not illustrated, polarizers may be further formed on the upper and lower sides of the display device. The polarizers may include a first polarizer and a second polarizer. The first polarizer may be attached onto the lower side of the substrate 110, and the second polarizer may be attached onto the encapsulation layer 390.

Figure 8:
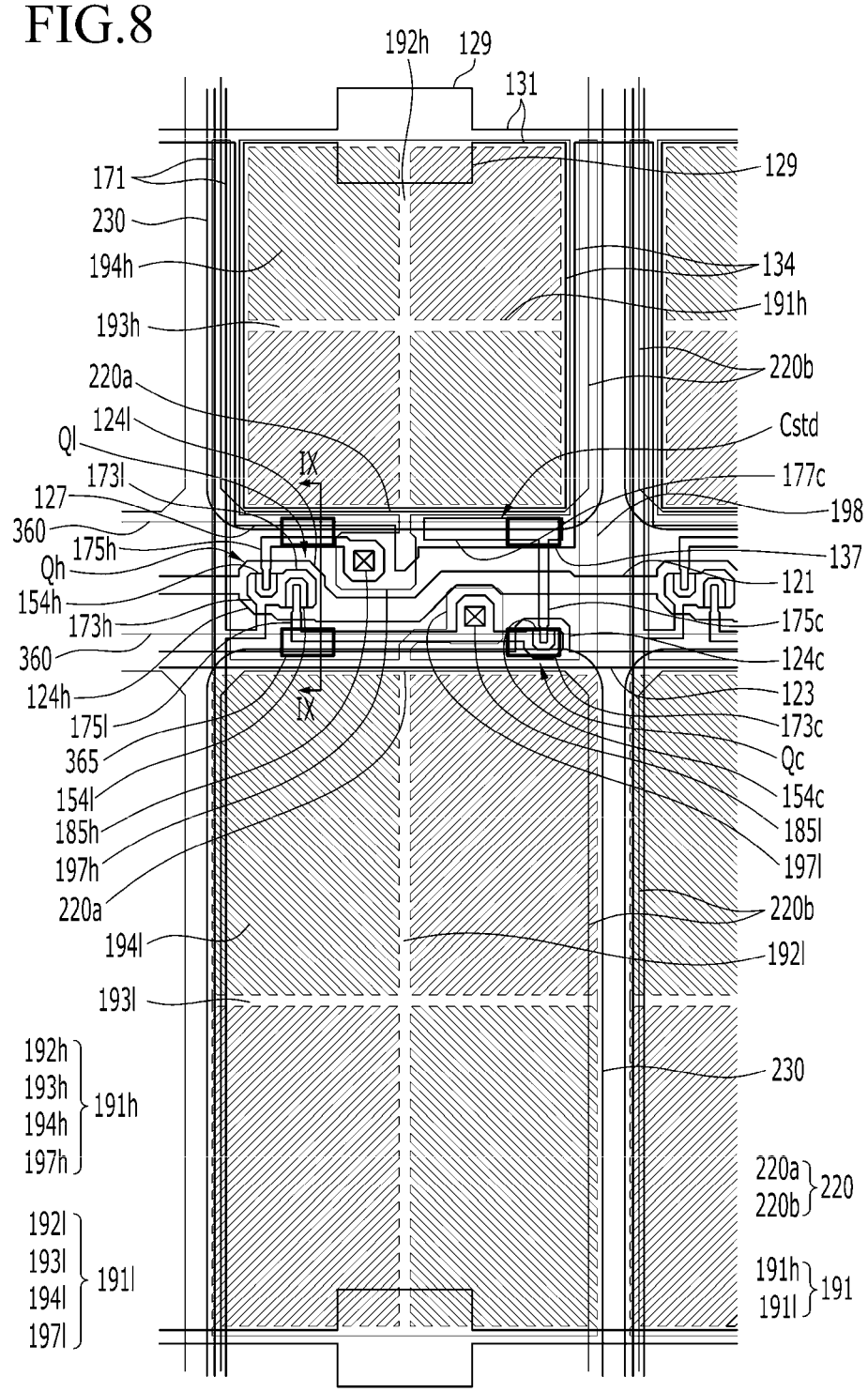
FIG. 8 is a plan view illustrating a pixel of a display device according to an embodiment of the present invention.
Figure 9:
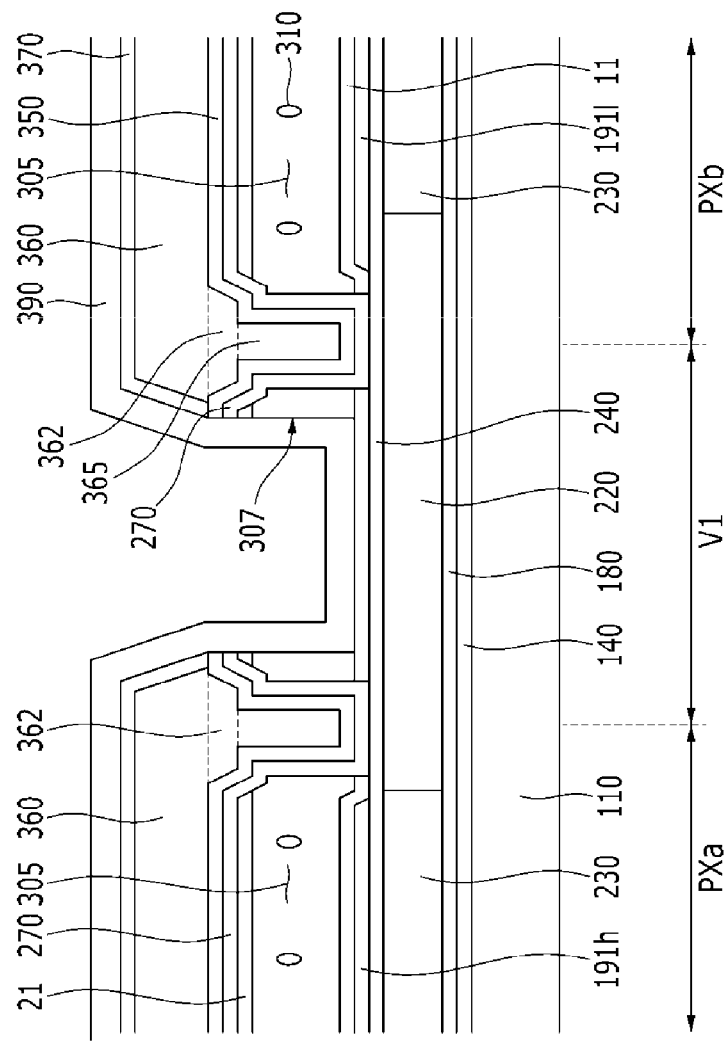
FIG. 9 is a cross-sectional view taken along line IX-IX indicated in FIG. 8 according to an embodiment of the present invention.
Figure 10:
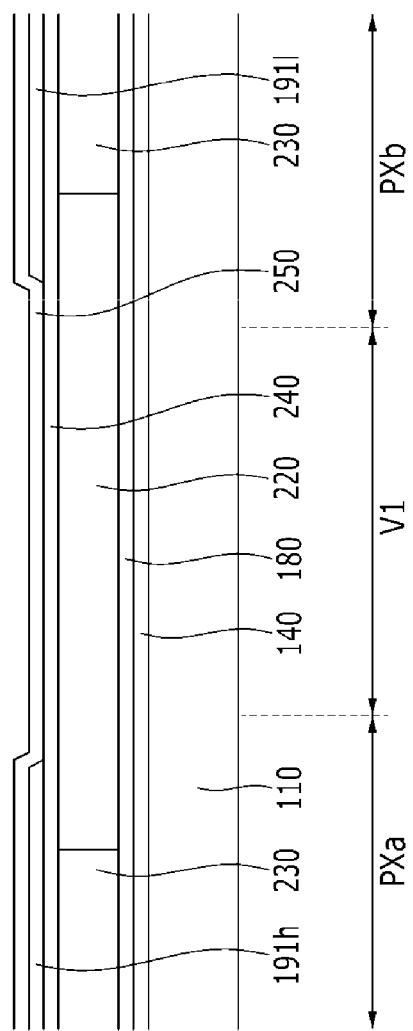
FIGS. 10 to 14 are process cross-sectional views illustrating a method for manufacturing a display device according to an embodiment of the present invention.

FIG. 8 is a plan view illustrating a pixel of a display device according to an embodiment of the present invention. FIG. 9 is a cross-sectional view taken along line IX-IX indicated in FIG. 8 according to an embodiment of the present invention.

Elements and features of the display device illustrated in FIGS. 8 and 9 may be identical to or analogous to elements and features of the display device illustrated in FIGS. 1 to 7. Description of identical or analogous elements and/or features may be omitted. In the display device illustrated in FIGS. 8 and 9, support members may not overlap any pixel electrode in a direction perpendicular to a top surface of a pixel electrode.

Referring to FIGS. 8 and 9, in a display device according to an exemplary embodiment of the present invention, a thin film transistor and a pixel electrode 191 connected to the thin film transistor are formed on a substrate 110. A roof layer 360 overlaps the pixel electrode 191. A microcavity 305 is disposed between the roof layer 360 and the pixel electrode 191. A support member 365 is formed in the microcavity 305 and is adjacent to an injection hole 307. A liquid crystal layer that includes liquid crystal molecules 310 is formed in the microcavity 305. An encapsulation layer 390 is formed on the roof layer 360 to seal the microcavity 305.

The support member 365 is connected to the roof layer 360 and may be made of the same material as the roof layer 360. A portion of a third insulating layer 350 and a portion of a common electrode 270 may be positioned between the support member 365 and at least one of a first insulating layer 240 and a light blocking member 220. The portion of the common electrode 270 may directly contact the first insulating layer 240 and/or the light blocking member 220. The support member 365 may not overlap the pixel electrode 191 in a direction perpendicular to a top surface of the pixel electrode 191. Accordingly, even though no additional insulating layer is formed between the pixel electrode 191 and the common electrode 270, there may be no short-circuit between the common electrode 270 and the pixel electrode 191.

FIGS. 10 to 14 are process cross-sectional views illustrating a method for manufacturing a display device according to an embodiment of the present invention.

A gate line 121 and a step-down gate line 123 (both extending in one direction) are formed on a substrate 110, which may be made of glass or plastic. Substantially simultaneously, a first gate electrode 124h, a second gate electrode 124l, and a third gate electrode 124c, which protrude from the gate line 121, are formed.

Substantially simultaneously, a storage electrode line 131 may be formed. The storage electrode line 131 may be spaced apart from the gate line 121, the step-down gate line 123, and the gate electrodes 124h, 124l, and 124c.

Subsequently, a gate insulating layer 140 is formed on the entire surface of a substrate 110 and may cover the gate line 121, the step-down gate line 123, the gate electrodes 124h, 124l, and 124c, and the storage electrode 131. The gate insulating layer 140 may be formed of an inorganic insulating material, such as silicon oxide or silicon nitride. The gate insulating layer 140 may have a single layer structure or a multiple layer structure.

Subsequently, a first semiconductor 154h, a second semiconductor 154l, and a third semiconductor 154c are formed by depositing a semiconductor material (such as at least one of amorphous silicon, polycrystalline silicon, and metal oxide) on the gate insulating layer 140 and then patterning the deposited semiconductor material. The first semiconductor 154h may be positioned on the first gate electrode 124h, the second semiconductor 154l may be positioned on the second gate electrode 124I, and the third semiconductor 154c may be positioned on the third gate electrode 124c. Subsequently, a data line 171 (extending in the other direction) is formed by depositing a metal material and then patterning the deposited metal material. The metal material may have a single layer structure or a multiple layer structure.

Substantially simultaneously, a first source electrode 173h (which protrudes from the data line 171 above the first gate electrode 124h) and a first drain electrode 175h (which is spaced apart from the first source electrode 173h) are formed. Substantially simultaneously, a second source electrode 173l (which is connected to the first source electrode 173h) and a second drain electrode 175l (which is spaced apart from the second source electrode 173l) are formed. Substantially simultaneously, a third source electrode 173c (which extends from the second drain electrode 175l) and a third drain electrode 175c (which is spaced apart from the third source electrode 173c) are formed.

The semiconductors 154h, 154l, and 154c, the data line 171, the source electrodes 173h, 173l, and 173c, and the drain electrodes 175h, 175l, and 175c may be formed by sequentially depositing a semiconductor material and a metal material and then patterning the semiconductor material and the metal material in a same patterning process. In an embodiment, the first semiconductor 154h may overlap a portion of the data line 171.

The gate electrodes 124h, 124l, and 124c, the source electrodes 173h, 173l, and 173c, and the drain electrodes 175h, 175l, and 175c form thin film transistors (TFTs) Qh, Ql, and Qc together with the semiconductors 154h, 154l, and 154c, respectively.

Subsequently, a passivation layer 180 is formed on the data line 171, the source electrodes 173h, 173l, and 173c, the drain electrodes 175h, 175l, and 175c, and the semiconductors 154h, 154l, and 154c exposed between the respective source electrodes 173h, 173l, and 173c and the respective drain electrodes 175h, 175l, and 175c. The passivation layer 180 may be made of an organic insulating material and/or an inorganic insulating material. The passivation layer 180 may have a single layer structure or a multiple layer structure.

Subsequently, a color filter 230 is formed in each pixel area PX on the passivation layer 180. A color filter 230 or a portion of a color filter 230 is formed in each of the first subpixel area PXa and the second subpixel area PXb. No color filter may be formed at the first valley V1. Color filters 230 having the same color may be formed in a column direction in columns of the plurality of pixel areas PX. For forming color filters 230 having three colors, a first colored color filter 230 may be first formed and then a second colored color filter 230 may be formed by shifting a mask. Subsequently, the second colored color filter 230 may be formed and then a third colored color filter may be formed by shifting a mask.

Subsequently, a light blocking member 220 is formed on a boundary of each pixel area PX and may be formed on the passivation layer 180 and the thin film transistors. The light blocking member 220 may also be formed at the first valley V1 positioned between the first subpixel area PXa and the second subpixel area PXb.

The light blocking member 220 may be formed at one or more edges of each pixel area PX. The light blocking member 220 may overlap a support member 365 that is subsequently formed.

In an embodiment, the light blocking member 220 is formed after the color filters 230 have been formed. In an embodiment, the light blocking member 220 may be formed before formation of the color filters 230.

Subsequently, a first insulating layer 240, which may be made of an inorganic insulating material such as at least one of silicon nitride (SiNx) and silicon oxide (SiOx), is formed on the color filter 230 and the light blocking member 220.

Subsequently, a first contact hole 185h is formed by etching the passivation layer 180, the light blocking member 220, and the first insulating layer 240 so as to expose a part of the first drain electrode 175h, and a second contact hole 185l is formed so as to expose a part of the second drain electrode 175l.

Subsequently, a first subpixel electrode 191h is formed in the first subpixel area PXa, and a second subpixel electrode 191l is formed in the second subpixel area PXb, by depositing and patterning a transparent metal material, such as at least one of indium tin oxide (ITO) and indium zinc oxide (IZO), on the first insulating layer 240. The first subpixel electrode 191h and the second subpixel electrode 191l are separated from each other with the first valley V1 being positioned therebetween. The first subpixel electrode 191h is connected to the first drain electrode 175h through the first contact hole 185h, and the second subpixel electrode 191l is connected to the second drain electrode 175l through the second contact hole 185l.

Horizontal stems 193h and 193l as well as vertical stems 192h and 192l crossing the horizontal stems 193h and 193l are formed in the first subpixel electrode 191h and the second subpixel electrode 191l, respectively. Further, a plurality of minute branches 194h and 194l, which obliquely extend from the horizontal stems 193h and 193l and the vertical stems 192h and 192l, is formed.

Subsequently, a second insulating layer 250 may be formed on the pixel electrode 191 using an inorganic insulating material, such as at least one of silicon nitride (SiNx) and silicon oxide (SiOx). The second insulating layer 250 may prevent a short circuit between the pixel electrode 191 and the subsequently formed common electrode 270. In an embodiment, support members 365 may not overlap the pixel electrode 191 in a direction perpendicular to a top surface of the pixel electrode, and the process for forming the second insulating layer 250 may be omitted.

Figure 11:
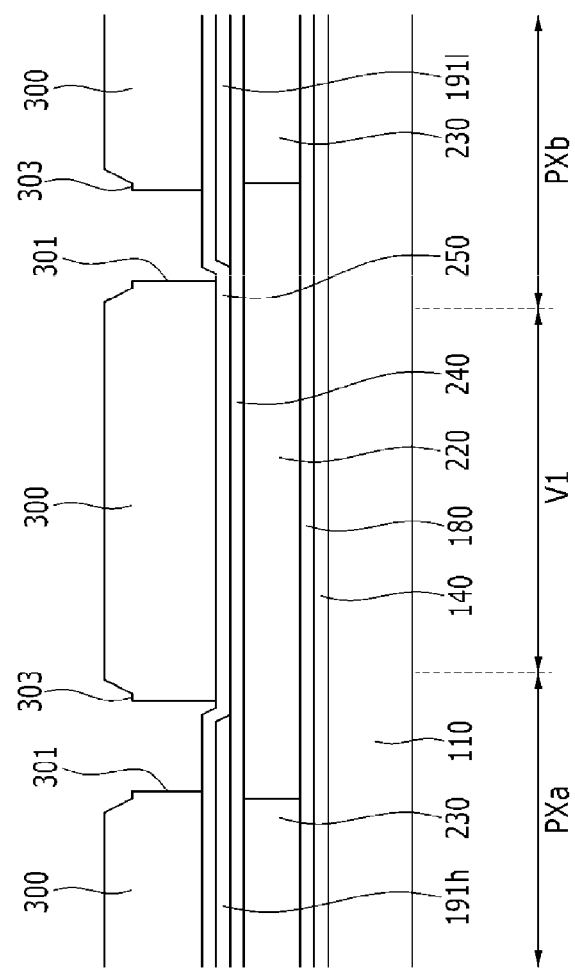

Referring to FIG. 11, a sacrificial layer 300 is formed by coating a photosensitive organic material on the pixel electrode 191 and performing a photolithography process.

Portions of the sacrificial layer 300 are formed to be connected to each other along the plurality of pixel columns. The sacrificial layer 300 is formed to cover each pixel area PX and to cover the first valley V1 positioned between the first subpixel area PXa and the second subpixel area PXb.

A portion of the photosensitive organic material positioned at the second valley V2 is removed by the photolithography process. Openings 301 are formed by removing portions of the photosensitive organic material through the photolithography process. Two openings 301 may be formed to be adjacent to two edges of the first valley V1. A portion of the sacrificial layer 300 that is positioned between two openings 301 may overlap a first valley V1. Portions of the second insulating layer 250 may be exposed by the openings 301.

When the openings 301 are formed, groove portions 303 may be formed on the sacrificial layer 300 by slit-exposing or halftone-exposing the surroundings of the openings 301. In order to form the groove portions 303, the sacrificial layer 300 may be patterned using a slit mask or a halftone mask. Since a groove portion 303 is formed by removing a part of the sacrificial layer 300, a portion of the sacrificial layer 300 that is associated with the groove portion 303 has a smaller thickness (in a direction perpendicular to a top surface of a pixel electrode 191) than other portions of the sacrificial layer 300. A groove portion 303 may be formed to surround an opening 301.

Figure 12:
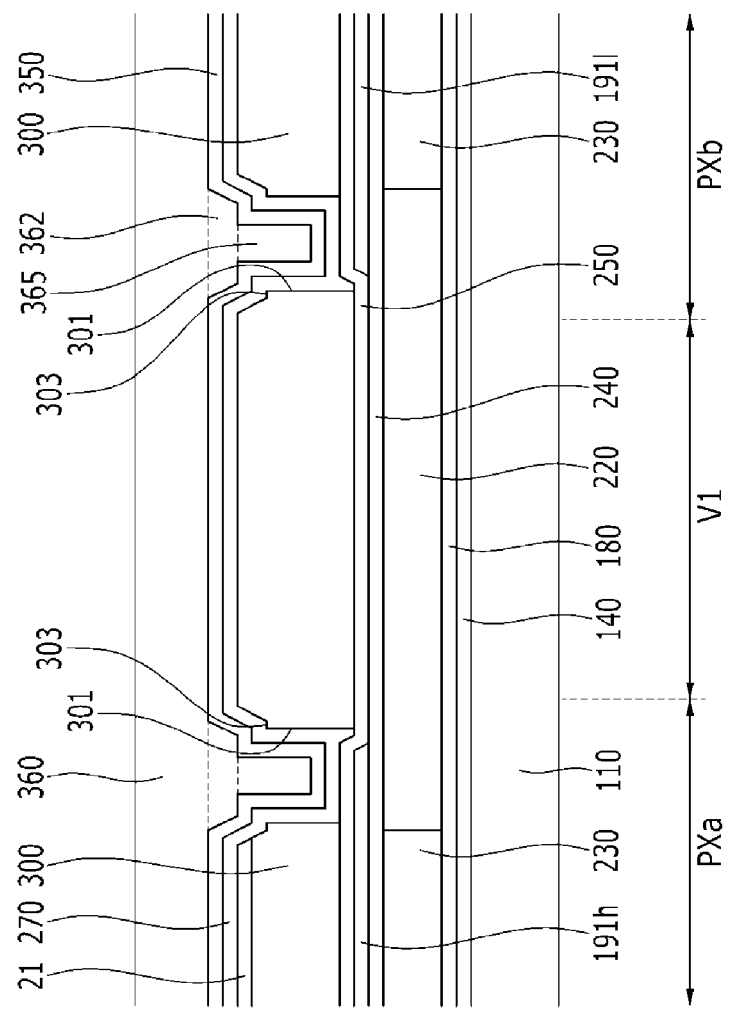

Referring to FIG. 12, a common electrode 270 is formed by depositing a transparent metal material, such as at least one of indium tin oxide (ITO) and indium zinc oxide (IZO), on the sacrificial layer 300.

Subsequently, a third insulating layer 350 may be formed on the common electrode 270 using an inorganic insulating material, such as at least one of silicon oxide and silicon nitride.

Subsequently, a roof layer 360 is formed on the third insulating layer 350 with an organic material, and support members 365 may formed in the openings 301. The roof layer 360 and the support members 365 may be formed using the same material during the same process. A support member 365 may be disposed between two portions of the third insulating layer 350 and/or may be disposed between two portions of the common electrode 270.

During a process of forming the roof layer 360 and the openings 301, step members 362 may be formed in the groove portions 303 of the sacrificial layer 300. An organic material may be coated on the entire substrate 110 after the third insulating layer 350 has been formed. The roof layer 360, the support members 365, and the step members 362 may be substantially simultaneously formed using the organic material. In an embodiment, the roof layer 360, the support members 365, and the step members 362 may be formed using the same material during the same process.

At least a portion of common electrode 270 and at least a portion of the third insulating layer 350 are positioned between a support member 365 and a pixel electrode 191, wherein the support member 365 may overlap the pixel electrode 191. In an embodiment, at least a portion of the second insulating layer 250 is disposed between the pixel electrode 191 and the common electrode 270 and may prevent short circuit between the pixel electrode 191 and the common electrode 270. The portion of the second insulating layer 250 may directly contact each of the pixel electrode 191 and the common electrode 270.

A support member 365 has a column shape in a cross-sectional view of the display device. In a plan view of the display device, the support member 365 may have one or more of various shapes, such as a circle, a rectangle, and a triangle.

A portion of the roof layer material (i.e., the organic material for forming the roof layer 360) that is positioned at the first valley V1 may be removed by patterning the roof layer material. As a result, as illustrated in FIG. 1, portions of the roof layer 360 (or roof layers 360) may separately overlap pixel rows.

Figure 13:
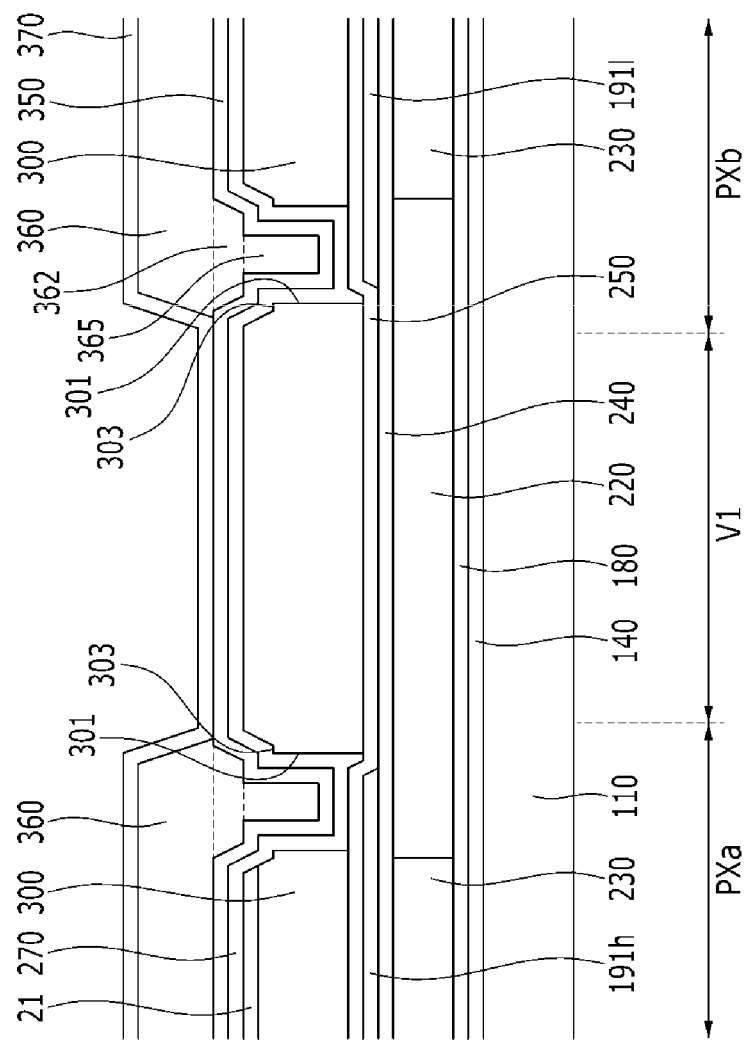

Subsequently, referring to FIG. 13, a fourth insulating layer 370 may be formed on the roof layer 360 with an inorganic insulating material, such as at least one of silicon nitride (SiNx) and silicon oxide (SiOx). The fourth insulating layer 370 is formed on the patterned roof layer 360 to cover and protect sides of the roof layer 360.

Figure 14:
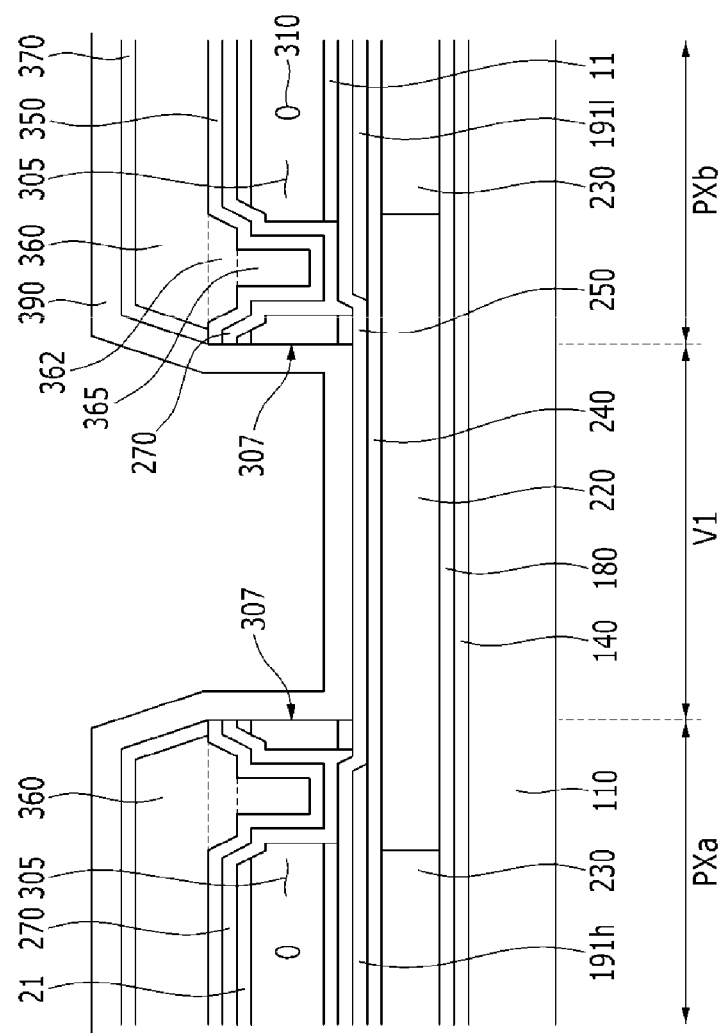

Referring to FIG. 14, portions of the fourth insulating layer 370, the third insulating layer 350, and the common electrode 270 that are positioned at the first valley V1 are removed by patterning the fourth insulating layer 370, the third insulating layer 350, and the common electrode 270. As a result, a portion of the sacrificial layer 300 that is positioned at the first valley V1 is exposed.

Subsequently, the sacrificial layer 300 is fully removed by supplying a developer to the sacrificial layer 300. Alternatively or additionally, the sacrificial layer 300 is fully removed using an ashing process.

When the sacrificial layer 300 is removed, microcavities 305 may be formed at positions where the sacrificial layer 300 has been previously positioned.

The pixel electrode 191 and the common electrode 270 are spaced apart from each other with the microcavity 305 being positioned therebetween, and the pixel electrode 191 and the roof layer 360 are spaced apart from each other with the microcavity 305 being positioned therebetween. The common electrode 270 and the roof layer 360 may cover the top of microcavity 305 and may at least partially cover sides of the microcavity 305.

The microcavity 305 is exposed at an opening formed as a result of removal of portions of the roof layer 360 and the common electrode 270. The opening is called an injection hole 307. An injection hole 307 may be formed along the first valley V1. In an embodiment, a first injection hole 307 may be formed at a first edge of the first subpixel area PXa, a second injection hole 307 may be formed at a first edge of the second subpixel area PXb. The first edge of the first subpixel area PXa and the first edge of the second subpixel area PXb may immediately neighbor each other and may be positioned between a second edge of the first subpixel area PXa and a second edge of the second subpixel area PXb. In an embodiment, the first edge of the first subpixel area PXa may be a lower edge of the first subpixel area PXa, and the first edge of the second subpixel area PXb may be an upper edge of the second subpixel area PXb. In an embodiment, the injection hole 307 may also be formed along the second valley V2.

A support member 365 may be disposed adjacent to an injection hole 307 and may be disposed in a microcavity 305. In an embodiment, a microcavity 305 may have exactly two injection holes 307, wherein one of the two injection holes 307 may correspond to (e.g., be adjacent to) one or more support members 365, and the other one of the two injection holes 307 may correspond to no support member 365.

In an embodiment, as illustrated in FIG. 1, support members 365 are formed along two sides of only one first valley V1 of two immediately neighboring first valley V1. In an embodiment, as illustrated in FIG. 1, support members 365 are formed in only one pixel area row of two immediately neighboring pixel area rows.

A plurality of support members 365 may be formed at an edge of a microcavity 305.

Subsequently, referring to FIG. 14, the roof layer 360 is cured by applying heat to at least one of the roof layer 360 and the substrate 110. As a result, the shape of the microcavity 305 may be maintained by the roof layer 360.

Subsequently, an aligning agent containing an alignment material may be dropped on the substrate 110 using a spin coating method and/or an inkjet method. The aligning agent may be provided (e.g., injected) into the microcavity 305 through the injection hole 307. Subsequently, a curing process may be performed. As a result, a solution component may be evaporated, and an alignment material may remain on the inner wall of the microcavity 305 to form alignment layers 11 and 21.

The first alignment layer 11 may be formed on the pixel electrode 191, and the second alignment layer 21 may be formed on the common electrode 270. The first alignment layer 11 and the second alignment layer 21 may overlap each other with the microcavity 305 being positioned therebetween and may be connected to each other at an edge of the pixel area PX.

In an embodiment, the alignment layers 11 and 21 may be configured to substantially align liquid crystal molecules in a vertical direction that is substantially perpendicular to the substrate 110 (i.e., perpendicular to a surface of the substrate 110 that overlaps the roof layer 360, except, for example, at positions where bead members 400 are located. In an embodiment, a process of irradiating UV light on the alignment layers 11 and 21 may be performed; as a result, the alignment layers 11 and 21 may be configured to substantially align liquid crystal molecules in a horizontal direction that is substantially parallel to the substrate 110.

During a drying process of the alignment layer, solids of the aligning agent may concentrate near supporting member 365 during a drying process. In an embodiment, since the support members 365 are positioned at an edge of a microcavity 305, the concentrated solids of the aligning agent may not substantially block light that is transmitted through the liquid crystal layer. Therefore, the concentrated solids of the alignment agent may not significant influence the image display quality of the display device.

In an embodiment, the light blocking member 220 may overlap support members 365 and may substantially overlap concentrated solids of the aligning agent, such that influence of the concentrated solids of the aligning agent on image display quality may be minimized. Since supporting members are formed at an edge of a microcavity 305, an area of a pixel that is overlapped by the light blocking member 220 may be minimized. Advantageously, an aperture ratio may be maximized.

Subsequently, referring to FIG. 14, liquid crystal material that includes liquid crystal molecules 310 is provided (e.g., dropped) on the substrate 110 using an inkjet method or a dispensing method. The liquid crystal material is provided (e.g., injected) into a microcavity 305 through a corresponding injection hole 307. In an embodiment, liquid crystal material may be provided (e.g., dropped) through injection holes 307 formed along only one first valley V1 of two immediately neighboring first valleys V1 that does not correspond to support members 365. For example, support members 365 are formed along two sides of each odd numbered first valley V1, and liquid crystal material is dropped in only the even-numbered first valleys V1 without being dropped in the odd-numbered first valleys V1. As another example, support members 365 are formed along two sides of each even numbered first valley V1, and liquid crystal material is dropped in only the odd-numbered first valleys V1 without being dropped in the even-numbered first valleys V1.

In an embodiment, liquid crystal material is provided to the injection holes 307 formed along the odd-numbered first valleys V1, and the liquid crystal material may enter the injection hole 307 through capillary action into the microcavity 305. As the liquid crystal material enters into the microcavity 305, the liquid crystal material may push the air in the microcavity 305 such that the air may be discharged through the injection hole 307 formed along the even-numbered first valley V1.

In an embodiment, since liquid crystal material is dropped only one first valley V1 of two immediately neighboring first valley V1 that does not correspond to support members 365, potential obstruction caused by support members 365 and/or concentrated solids of aligning agent may be substantially avoided. Advantageously, the process time may be substantially minimized, and associated costs may be minimized.

Subsequently, referring to FIG. 14, an encapsulation layer 390 is formed by depositing a material that does not substantially (chemically) react with the liquid crystal molecules 310 on the fourth insulating layer 370. The encapsulation layer 390 is formed to cover the injection hole 307 for sealing the microcavity 305.

Subsequently, although not illustrated, a first polarizer may be attached onto the lower side of the substrate 110, and a second polarizer may be attached onto the encapsulation layer 390.

While this invention has been described in connection with what is presently considered to be practical embodiments, it is to be understood that the invention is not limited to the disclosed embodiments. The invention is intended to cover various modifications and equivalent arrangements included within the spirit and scope of the appended claims.

<Description of symbols>

| | |
|---|---|
| 11: First alignment layer | 21: Second alignment layer |
| 110: Substrate | 121: Gate line |
| 123: Step-down gate line | 124h: First gate electrode |
| 124l: Second gate electrode | 124c: Third gate electrode |
| 131: Storage electrode line | 140: Gate insulating layer |
| 154h: First semiconductor | 154l: Second semiconductor |
| 154c: Third semiconductor | 171: Data line |
| 173h: First source electrode | 173l: Second source electrode |
| 173c: Third source electrode | 175h: First drain electrode |
| 175l: Second drain electrode | 175c: Third drain electrode |
| 180: Passivation layer | 191: Pixel electrode |
| 191h: First subpixel electrode | 191l: Second subpixel electrode |
| 220: Light blocking member | 230: Color filter |
| 240: First insulating layer | 250: Second insulating layer |
| 270: Common electrode | 300: Sacrificial layer |
| 301: Opening | 303: Groove portion |
| 305: Microcavity | 307: Injection hole |
| 310: Liquid crystal molecule | 350: Third insulating layer |
| 360: Roof layer | 362: Step member |
| 365: Support member | 370: Fourth insulating layer |
| 390: Encapsulation layer | |

What is claimed is:

1. A display device comprising:
   a first subpixel electrode;
   a first roof layer;
   a first liquid crystal layer, which is disposed between the first subpixel electrode and the first roof layer;
   a first support member, which overlaps a first end portion of the first roof layer in a first direction and overlaps the first liquid crystal layer in a second direction;
   a second subpixel electrode, which immediately neighbors the first subpixel electrode without any subpixel electrode being disposed between the first subpixel electrode and the second subpixel electrode;

a second roof layer;
a second liquid crystal layer, which is disposed between the second subpixel electrode and the second roof layer;
a second support member, which overlaps a first end portion of the second roof layer in the first direction and overlaps the second liquid crystal layer in the second direction; and
a contact member,
wherein a first portion of the contact member is positioned between the first support member and the second support member in the second direction, is positioned between the first liquid crystal layer and the second liquid crystal layer in the second direction, and directly contacts and confines the first liquid crystal layer,
wherein the first roof layer is positioned between the first support member and a second portion of the contact member in the first direction,
wherein a material of the first portion of the contact member is identical to a material of the second portion of the contact member, and
wherein the first end portion of the first roof layer and the first end portion of the second roof layer are disposed between a second end portion of the first roof layer and a second end portion of the second roof layer.

2. The display device of claim 1,
wherein the second end portion of the first roof layer does not overlap, in the first direction, any support member that is analogous to the first support member or the second support member, and
wherein the second end portion of the second roof layer does not overlap, in the first direction, any support member that is analogous to the first support member or the second support member.

3. The display device of claim 1, further comprising:
a third subpixel electrode, which immediately neighbors the second subpixel electrode without any subpixel electrode being disposed between the second subpixel electrode and the third subpixel electrode,
wherein the second subpixel electrode is disposed between the first subpixel electrode and the third subpixel electrode,
wherein the second roof layer overlaps both the second subpixel electrode and the third subpixel electrode,
wherein a center portion of the second roof layer is disposed between the first end portion of the second roof layer and the second end portion of the second roof layer, and
wherein the center portion of the second roof layer does not overlap, in the first direction, any support member that is analogous to the first support member or the second support member.

4. The display device of claim 3, further comprising:
a fourth subpixel electrode, which immediately neighbors the third subpixel electrode without any subpixel electrode being disposed between the third subpixel electrode and the fourth subpixel electrode; and
a third roof layer, which overlaps the fourth subpixel electrode in the first direction,
wherein the third subpixel electrode is disposed between the second subpixel electrode and the fourth subpixel electrode,
wherein the second end portion of the second roof layer and a first end portion of the third roof layer are disposed between the first end portion of the second roof layer and a second end portion of the third roof layer, and
wherein the first end portion of the third roof layer does not overlap, in the first direction, any support member that is analogous to the first support member or the second support member.

5. The display device of claim 4, further comprising:
a third support member, which overlaps the second end portion of the third roof layer in the first direction.

6. The display device of claim 1, further comprising:
a step member disposed between the first support member and the first roof layer, wherein a width of the step member in the second direction is larger than a width of the first support member in the second direction.

7. The display device of claim 6, wherein the first support member, the first roof layer, and the step member are made of a same material.

8. The display device of claim 1, further comprising:
an insulating layer disposed between the first support member and the first subpixel electrode,
wherein the first support member overlaps the first subpixel electrode in the first direction.

9. The display device of claim 1,
wherein a portion of the first liquid crystal layer is positioned between the contact member and the first support member in the second direction.

10. A display device comprising:
a first subpixel electrode;
a first roof layer;
a first liquid crystal layer, which is disposed between the first subpixel electrode and the first roof layer;
a first support member, which overlaps a first end portion of the first roof layer in a first direction and overlaps the first liquid crystal layer in a second direction;
a second subpixel electrode, which immediately neighbors the first subpixel electrode without any subpixel electrode being disposed between the first subpixel electrode and the second subpixel electrode;
a second roof layer;
a second liquid crystal layer, which is disposed between the second subpixel electrode and the second roof layer; and
a second support member, which overlaps a first end portion of the second roof layer in the first direction and overlaps the second liquid crystal layer in the second direction;
a third subpixel electrode, which immediately neighbors the second subpixel electrode without any subpixel electrode being disposed between the second subpixel electrode and the third subpixel electrode;
a fourth subpixel electrode, which immediately neighbors the third subpixel electrode without any subpixel electrode being disposed between the third subpixel electrode and the fourth subpixel electrode;
a third roof layer, which overlaps the fourth subpixel electrode in the first direction; and
a third support member, which overlaps the second end portion of the third roof layer in the first direction,
wherein the first end portion of the first roof layer and the first end portion of the second roof layer are disposed between a second end portion of the first roof layer and a second end portion of the second roof layer,
wherein the second subpixel electrode is disposed between the first subpixel electrode and the third subpixel electrode,
wherein the second roof layer overlaps both the second subpixel electrode and the third subpixel electrode, wherein a center portion of the second roof layer is disposed between the first end portion of the second roof layer and the second end portion of the second roof layer, wherein the center portion of the second roof layer does not overlap, in the first direction, any support member that is analogous to the first support member or the second support member, wherein the third subpixel electrode is disposed between the second subpixel electrode and the fourth subpixel electrode, wherein the second end portion of the second roof layer and a first end portion of the third roof layer are disposed between the first end portion of the second roof layer and a second end portion of the third roof layer, and wherein the first end portion of the third roof layer does not overlap, in the first direction, any support member that is analogous to the first support member or the second support member.

11. A display device comprising:

a first subpixel electrode;

a first roof layer;

a first liquid crystal layer, which is disposed between the first subpixel electrode and the first roof layer;

a first support member, which overlaps a first end portion of the first roof layer in a first direction and overlaps the first liquid crystal layer in a second direction;

a second subpixel electrode, which immediately neighbors the first subpixel electrode without any subpixel electrode being disposed between the first subpixel electrode and the second subpixel electrode;

a second roof layer;

a second liquid crystal layer, which is disposed between the second subpixel electrode and the second roof layer;

a second support member, which overlaps a first end portion of the second roof layer in the first direction and overlaps the second liquid crystal layer in the second direction; and a contact member, which is positioned between the first support member and the second support member, is positioned between the first liquid crystal layer and the second liquid crystal layer, and directly contacts and confines the first liquid crystal layer, wherein the first end portion of the first roof layer and the first end portion of the second roof layer are disposed between a second end portion of the first roof layer and a second end portion of the second roof layer, and wherein a portion of the first liquid crystal layer is positioned between the contact member and the first support member in the second direction.

* * * * *